US012272791B2

(12) United States Patent
Jang

(10) Patent No.: US 12,272,791 B2
(45) Date of Patent: *Apr. 8, 2025

(54) FLAME-RESISTANT HYBRID INORGANIC-POLYMERIC SOLID-STATE ELECTROLYTES AND LITHIUM BATTERIES CONTAINING SAME

(71) Applicant: Honeycomb Battery Company, Dayton, OH (US)

(72) Inventor: Bor Z. Jang, Centerville, OH (US)

(73) Assignee: Honeycomb Battery Company, Dayton, OH (US)

( * ) Notice: Subject to any disclaimer, the term of this patent is extended or adjusted under 35 U.S.C. 154(b) by 379 days.

This patent is subject to a terminal disclaimer.

(21) Appl. No.: 17/410,282

(22) Filed: Aug. 24, 2021

(65) Prior Publication Data
US 2023/0096724 A1    Mar. 30, 2023

(51) Int. Cl.
*H01M 4/62* (2006.01)
*H01M 10/0525* (2010.01)
*H01M 10/0569* (2010.01)

(52) U.S. Cl.
CPC ... *H01M 10/0569* (2013.01); *H01M 10/0525* (2013.01); *H01M 2300/0028* (2013.01)

(58) Field of Classification Search
CPC ......... H01M 10/0569; H01M 10/0525; H01M 2300/0028
See application file for complete search history.

(56) References Cited

U.S. PATENT DOCUMENTS

| 5,952,126 A * | 9/1999 | Lee | H01M 10/0565 429/324 |
| 6,465,135 B1 * | 10/2002 | Nishimura | H01M 10/0569 429/317 |
| 11,121,404 B2 * | 9/2021 | Yu | H01M 10/0565 |

(Continued)

FOREIGN PATENT DOCUMENTS

| CN | 112234249 A | 1/2021 |
| CN | 112290083 A | 1/2021 |

(Continued)

OTHER PUBLICATIONS

International Patent Application No. PCT/US2022/075385; International Search Report dated Dec. 13, 2022; 4 pages.

(Continued)

*Primary Examiner* — Osei K Amponsah

(57) ABSTRACT

A rechargeable lithium battery comprising an anode, a cathode, and a hybrid electrolyte in ionic communication with the anode and the cathode, wherein: (a) the hybrid electrolyte comprises a mixture of a polymer and particles of an inorganic solid electrolyte; (b) the polymer is a polymerization or crosslinking product of a reactive additive, wherein the reactive additive comprises (i) a first liquid solvent that is polymerizable, (ii) an initiator or curing agent, and (iii) a lithium salt; (c) the polymer is present in the anode, the cathode, the separator, between the anode and the separator, or between the cathode and the separator; and (d) the hybrid electrolyte forms a contiguous phase in the cathode or in the anode, and occupies from 3% to 40% by volume of the cathode or from 3% to 40% by volume of the anode. Also provided is a process for producing the lithium cell.

28 Claims, 5 Drawing Sheets

Discharged state (or as manufactured)

(56) References Cited

U.S. PATENT DOCUMENTS

| | | |
|---|---|---|
| 2016/0294004 A1 | 10/2016 | Sasaki et al. |
| 2017/0133717 A1 | 5/2017 | Makino et al. |
| 2018/0166759 A1 | 6/2018 | Zhamu et al. |
| 2019/0123384 A1 | 4/2019 | Harry et al. |
| 2020/0350589 A1 | 11/2020 | Jang |
| 2021/0043969 A1 | 2/2021 | Harrup |
| 2021/0143413 A1 | 5/2021 | Lee |
| 2021/0280871 A1 | 9/2021 | Jang |

FOREIGN PATENT DOCUMENTS

| | | |
|---|---|---|
| CN | 113234195 A | 8/2021 |
| CN | 111933894 B | 4/2022 |
| EP | 0822608 B1 | 11/2001 |
| JP | H09082360 A | 3/1997 |
| JP | 2010033876 A | 2/2010 |
| KR | 1020160013630 A | 2/2016 |
| KR | 1020180011207 A | 1/2018 |
| KR | 1020180115130 A | 10/2018 |
| KR | 102286808 B1 | 8/2021 |
| WO | 2018183771 A1 | 10/2018 |
| WO | 2020214009 A1 | 10/2020 |

OTHER PUBLICATIONS

International Patent Application No. PCT/US2023/061308; International Search Report, 4 pages, dated May 15, 2023.

* cited by examiner

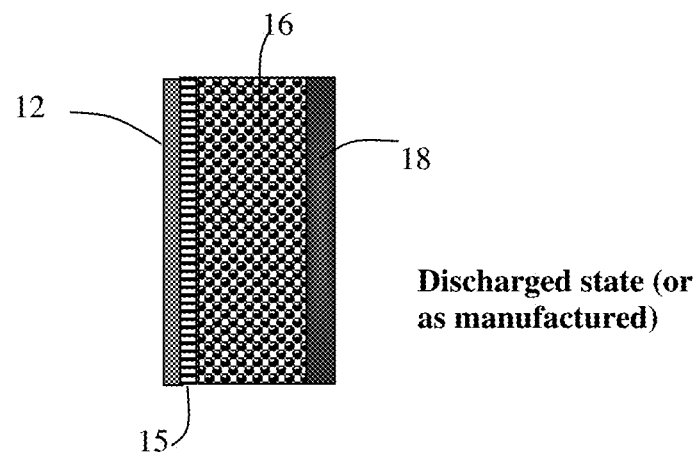
FIG. 2(A) Discharged state (or as manufactured)
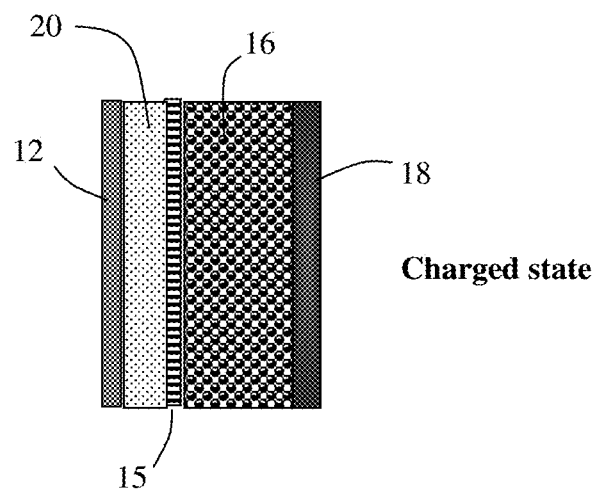
FIG. 2(B) Charged state

FLAME-RESISTANT HYBRID INORGANIC-POLYMERIC SOLID-STATE ELECTROLYTES AND LITHIUM BATTERIES CONTAINING SAME

FIELD

The present disclosure provides a fire/flame-resistant electrolyte and lithium batteries (lithium-ion and lithium metal batteries) containing such an electrolyte. The polymeric portion of the hybrid electrolyte is preferably cured or solidified in situ inside an electrode, a separator, and/or a battery cell.

BACKGROUND

Rechargeable lithium-ion (Li-ion) and lithium metal batteries (e.g., lithium-sulfur, lithium selenium, and Li metal-air batteries) are considered promising power sources for electric vehicle (EV), hybrid electric vehicle (HEV), and portable electronic devices, such as lap-top computers and mobile phones. Lithium as a metal element has the highest lithium storage capacity (3,861 mAh/g) compared to any other metal or metal-intercalated compound as an anode active material (except $Li_{4.4}Si$, which has a specific capacity of 4,200 mAh/g). Hence, in general, Li metal batteries (having a lithium metal anode) have a significantly higher energy density than lithium-ion batteries (having a graphite anode).

However, the liquid electrolytes used for lithium-ion batteries and all lithium metal secondary batteries pose some safety concerns. Most of the organic liquid electrolytes can cause thermal runaway or explosion problems.

Ionic liquids (ILs) are a new class of purely ionic, salt-like materials that are liquid at unusually low temperatures. The official definition of ILs uses the boiling point of water as a point of reference: "Ionic liquids are ionic compounds which are liquid below 100° C.". A particularly useful and scientifically interesting class of ILs is the room temperature ionic liquid (RTIL), which refers to the salts that are liquid at room temperature or below. RTILs are also referred to as organic liquid salts or organic molten salts. An accepted definition of an RTIL is any salt that has a melting temperature lower than ambient temperature.

Although ILs were suggested as a potential electrolyte for rechargeable lithium batteries due to their non-flammability, conventional ionic liquid compositions have not exhibited satisfactory performance when used as an electrolyte likely due to several inherent drawbacks: (a) ILs have relatively high viscosity at room or lower temperatures; thus being considered as not amenable to fast lithium ion transport; (b) For Li—S cell uses, ILs are capable of dissolving lithium polysulfides at the cathode and allowing the dissolved species to migrate to the anode (i.e., the shuttle effect remains severe); and (c) For lithium metal secondary cells, most of the ILs strongly react with lithium metal at the anode, continuing to consume Li and deplete the electrolyte itself during repeated charges and discharges. These factors lead to relatively poor specific capacity (particularly under high current or high charge/discharge rate conditions, hence lower power density), low specific energy density, rapid capacity decay and poor cycle life. Furthermore, ILs remain extremely expensive. Consequently, as of today, no commercially available lithium battery makes use of an ionic liquid as the primary electrolyte component.

Solid state electrolytes are commonly believed to be safe in terms of fire and explosion proof. Solid state electrolytes can be divided into organic (polymeric), inorganic, organic-inorganic composite electrolytes. However, the conductivity of well-known organic polymer solid state electrolytes, such as poly(ethylene oxide) (PEO), polypropylene oxide (PPO), poly(ethylene glycol) (PEG), and poly(acrylonitrile) (PAN), is typically low ($<10^{-5}$ S/cm).

Although the inorganic solid-state electrolyte (e.g., garnet-type and metal sulfide-type) can exhibit a high conductivity (from $0.05 \times 10^{-3}$ to $10^{-2}$ S/cm), the interfacial impedance or resistance between the inorganic solid-state electrolyte and the electrode (cathode or anode) is high. Further, the traditional inorganic ceramic electrolyte is very brittle and has poor film-forming ability and poor mechanical properties. These materials cannot be cost-effectively manufactured.

Furthermore, the most serious drawback of implementing the inorganic solid electrolyte (ISE) in an electrode (anode or cathode) is the notion that it would normally take a high loading of the ISE particles (typically 30-60% by volume) to meet the two essential conditions: (i) the electrolyte must form a contiguous phase through which lithium ions can travel to reach individual particles of an electrode (anode or cathode) active material; and (ii) substantially each and every electrode active material particle (e.g., graphite or Si particles in the anode or lithium metal oxide particles in the cathode) must be in physical contact with this contiguous electrolyte phase. This implies that the proportion of the electrode active material responsible for the lithium ion storage capability in an electrode would be reduced to less than 40-70%, leading to a significantly reduced energy density of the resulting battery cell. It is thus essential to minimize the amounts of the electrolyte and other non-active materials, such as conductive filler and binder, in an electrode.

The applicant's research group has previously developed the quasi-solid electrolytes (QSE), which may be considered as a fourth type of solid-state electrolyte. In certain variants of the quasi-solid electrolytes, a small amount of liquid electrolyte may be present to help improving the physical and ionic contact between the electrolyte and the electrode, thus reducing the interfacial resistance. A small proportion of liquid solvent dispersed in a majority of polymer matrix may be referred to as a state of "solvent-in-polymer". If the liquid solvent forms a continuous phase we have a state of "polymer-in-solvent". Both are herein referred to as a quasi-solid electrolytes. Examples of QSEs are disclosed in the following: Hui He, et al. "Lithium Secondary Batteries Containing a Non-flammable Quasi-solid Electrolyte," U.S. patent application Ser. No. 13/986,814 (Jun. 10, 2013); U.S. Pat. No. 9,368,831 (Jun. 14, 2016); U.S. Pat. No. 9,601,803 (Mar. 21, 2017); U.S. Pat. No. 9,601,805 (Mar. 21, 2017); U.S. Pat. No. 9,059,481 (Jun. 16, 2015).

However, the presence of certain liquid electrolytes may cause some problems, such as liquid leakage, gassing, and low resistance to high temperature. Therefore, a novel electrolyte system that obviates all or most of these issues is needed.

Hence, a general object of the present disclosure is to provide a safe, flame/fire-resistant, quasi-solid or solid-state electrolyte system for a rechargeable lithium cell that is compatible with existing battery production facilities. It is a further object of the present disclosure to provide an electrolyte that occupies a minimal proportion of the total volume of an electrode, yet still forms a contiguous phase in the electrode and is in physical contact with substantially all the electrode active material particles.

SUMMARY

The present disclosure provides rechargeable lithium battery cell comprising an anode, a cathode, and a hybrid quasi-solid or solid-state electrolyte in ionic communication with the anode and the cathode, wherein: (a) the hybrid electrolyte comprises a mixture of a polymer and an inorganic solid electrolyte (ISE); (b) the polymer is a polymerization or crosslinking product of a reactive additive, wherein the reactive additive comprises (i) a first liquid solvent that is polymerizable, (ii) an initiator or curing agent, and (iii) a lithium salt; wherein the first liquid solvent occupies from 1% to 99% by weight based on the total weight of the reactive additive; (c) the polymer is present in the anode, the cathode, the separator, an interface between the anode and the separator, or an interface between the cathode and the separator; and (d) the hybrid electrolyte forms a contiguous phase in the cathode and/or in the anode, and occupies from 3% to 40% (preferably less than 30%, more preferably less than 25%, further preferably less than 20%, even more preferably less than 15%, and most preferably less than 10%) by volume of the cathode and/or from 3% to 40% (preferably less than 30%, more preferably less than 25%, further preferably less than 20%, even more preferably less than 15%, and most preferably less than 10%) by volume of the anode.

Preferably, the hybrid electrolyte (particles of the inorganic solid electrolyte, ISE, and the polymer mixed together) has a lithium ion conductivity from $10^{-5}$ S/cm to $5\times10^{-2}$ S/cm. Preferably, the polymer alone (without the ISE) has a lithium ion conductivity from $10^{-8}$ S/cm to $5\times10^{-2}$ S/cm, more typically from $10^{-6}$ S/cm to $10^{-2}$ S/cm, more preferably greater than $10^{-5}$ S/cm, further more preferably greater than $10^{-4}$ S/cm, and most preferably greater than $10^{-3}$ S/cm.

In certain embodiments, the inorganic solid electrolyte material is present in the form of discrete particles (preferably from 10 nm to 5 μm in diameter) which are dispersed in or bonded by a polymer electrolyte (quasi-solid or solid-state polymer). The solid electrolyte material particles and the polymer electrolyte are adjacent to and physically connected to one another to form contiguous pathways for lithium ions.

In certain embodiments, the inorganic solid electrolyte material is selected from an oxide type, sulfide type, hydride type, halide type, borate type, phosphate type, lithium phosphorus oxynitride (LiPON), garnet-type, lithium superionic conductor (LISICON) type, sodium superionic conductor (NASICON) type, or a combination thereof.

Preferably, at least 20% by weight of the polymerizable first liquid solvent is polymerized; more preferably >50%, further preferably >70%, and most preferably >99% is polymerized.

In certain embodiments, the first liquid solvent comprises a liquid selected from the group consisting of vinylene carbonate, ethylene carbonate, fluoroethylene carbonate, ethylene glycol phenyl ether acrylate) (PEGPEA), ethoxylated trimethyl propyl triacrylate (ETPTA), tetrahydrofuran (THF), vinyl sulfite, vinyl ethylene sulfite, vinyl ethylene carbonate, 1,3-propyl sultone, 1,3,5-trioxane (TXE), 1,3-acrylic-sultones, methyl ethylene sulfone, methyl vinyl sulfone, ethyl vinyl sulfone, methyl methacrylate, vinyl acetate, acrylamide, 1,3-dioxolane (DOL), fluorinated ethers, fluorinated esters, sulfones, sulfides, dinitriles, acrylonitrile (AN), sulfates, siloxanes, silanes, N-methylacetamide, acrylates, ethylene glycols, phosphates, phosphonates, phosphinates, phosphines, phosphine oxides, phosphonic acids, phosphorous acid, phosphites, phosphoric acids, phosphazene compounds, derivatives thereof, and combinations thereof.

In the conventional lithium-ion battery or lithium metal battery industry, the organic liquid solvents listed above are commonly used as a solvent to dissolve a lithium salt therein and the resulting solutions are used as a liquid electrolyte. These liquid solvents are capable of dissolving a high amount of a lithium salt; however, many of them are highly volatile, having a low flash point and being highly flammable. Further, these liquid solvents are generally not known to be polymerizable, with or without the presence of a second liquid solvent, and a separate or different polymer or monomer is typically used in the industry to prepare a gel polymer electrolyte or solid polymer electrolyte.

It is uniquely advantageous to be able to polymerize the liquid solvent once the liquid electrolyte (having a lithium salt dissolved in the first liquid solvent) is injected into an electrode or into a battery cell. With such a novel strategy, one can readily reduce the volatile liquid solvent or completely eliminate the volatile liquid solvent all together. A desired amount of a second liquid solvent, preferably a flame-resistant liquid solvent, such as an ionic liquid, may be retained in the battery cell to improve the lithium ion conductivity of the electrolyte. This strategy enables us to achieve several desirable attributes of the resultant electrolyte: no liquid electrolyte leakage issue (the in situ cured polymer being capable of holding the remaining liquid together to form a gel or a "solvent-in-polymer" phase), adequate lithium salt amount, good lithium ion conductivity, reduced or eliminated flammability, good ability of the electrolyte to wet the surfaces of anode/cathode active materials (hence, significantly reduced interfacial impedance and internal resistance), processing ease, compatibility with current lithium-ion battery production processes and equipment, etc. This is of significant utility value since most of the organic solvents commonly used in the lithium battery are known to be volatile and flammable, posing a fire and explosion danger. Further, current solid-state electrolytes are not compatible with existing lithium-ion battery manufacturing equipment and processes.

The first polymerizable liquid solvent or the second liquid solvent may comprise an ionic liquid. The ionic liquid may be selected from the group consisting of room temperature ionic liquids having a cation selected from tetraalkylammonium, di-, tri-, or tetra-alkylimidazolium, alkylpyridinium, dialkyl-pyrrolidinium, dialkylpiperidinium, tetraalkylphosphonium, hexakis(bromomethyl)benzene, and trialkylsulfonium, 1-vinyl-3-dodecyl imidazolium bis(trifluoromethanesulfonyl) imide (VDIM-TFSI) or 1-vinyl-3-methylimidazolium bis[(trifluoromethyl)sulfonyl]imide (VMIMTFSI), 1-ethyl-3-methylimidazolium bis(trifluoromethanesulfonyl) imide (EMITFSI), [(poly(diallyldimethyl ammonium bis(fluorosulfonyl)imide, $(C_{10}H_{16}F_2N_2O_4S_2)n$, vinylimidazolium monomers with N-alkyl substituents, and combinations thereof.

In certain embodiments, the ionic liquid has an anion selected from $BF_4^-$, $B(CN)_4^-$, $CH_3BF_3^-$, $CH_2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, or a combination thereof.

In certain preferred embodiments, the second liquid solvent further comprises a flame retardant selected from an organic phosphorus compound, an inorganic phosphorus compound, a halogenated derivative thereof, or a combination thereof. The organic phosphorus compound or the inorganic phosphorus compound preferably is selected from the group consisting of phosphates, phosphonates, phosphonic acids, phosphorous acids, phosphites, phosphoric acids, phosphinates, phosphines, phosphine oxides, phosphazene compounds, derivatives thereof, and combinations thereof. These liquid solvents, if polymerizable, may also serve as a rust liquid solvent.

In certain embodiments, the first or the second liquid solvent comprises a liquid solvent selected from the group consisting of fluorinated ethers, fluorinated esters, sulfones, sulfides, nitriles, sulfates, siloxanes, silanes, combinations thereof, and combinations with phosphates, phosphonates, phosphinates, phosphines, phosphine oxides, phosphonic acids, phosphorous acid, phosphites, phosphoric acids, phosphazene compounds, derivatives thereof, and combinations thereof.

In some embodiments, the first or the second liquid solvent is selected from a phosphate, phosphonate, phosphinate, phosphine, or phosphine oxide having the structure of:

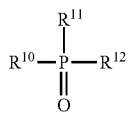

wherein $R^{10}$, $R^{11}$, and $R^{12}$, are independently selected from the group consisting of alkyl, aryl, heteroalkyl, heteroaryl, halogen substituted alkyl, halogen substituted aryl, halogen substituted heteroalkyl, halogen substituted heteroaryl, alkoxy, aryloxy, heteroalkoxy, heteroaryloxy, halogen substituted alkoxy, halogen substituted aryloxy, halogen substituted heteroalkoxy, and halogen substituted heteroaryloxy functional groups, and the second liquid solvent is stable under an applied electrical potential no less than 4 V (preferably no less than 4.5 V).

In some embodiments, the first or the second liquid solvent comprises a phosphoranamine having the structure of:

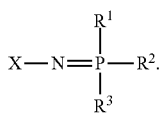

wherein $R^1$, $R^2$, and $R^3$ are independently selected from the group consisting of alkyl, aryl, heteroalkyl, heteroaryl, halogen substituted alkyl, halogen substituted aryl, halogen substituted heteroalkyl, halogen substituted heteroaryl, alkoxy, aryloxy, heteroalkoxy, heteroaryloxy, halogen substituted alkoxy, halogen substituted aryloxy, halogen substituted heteroalkoxy, and halogen substituted heteroaryloxy functional groups, wherein $R^1$, $R^2$, and $R^3$ are represented by at least two different substituents and wherein X is selected from the group consisting of an organosiylyl group or a tert-butyl group. The $R^1$, $R^2$, and $R^3$ may be each independently selected from the group consisting of an alkoxy group, and an aryloxy group.

Preferably, the lithium salt occupies 0.1%-50% by weight and the crosslinking agent and/or initiator occupies 0.1-50% by weight of the reactive additive.

In some embodiments, the polymer electrolyte exhibits a vapor pressure less than 0.001 kPa when measured at 20° C., a vapor pressure less than 10% of the vapor pressure of the combined first liquid solvent and lithium salt alone without the polymerization, a flash point at least 100 degrees Celsius higher than a flash point of the liquid solvent alone, a flash point higher than 200° C., or no measurable flash point and wherein the polymer has a lithium ion conductivity from $10^{-8}$ S/cm to $10^{-2}$ S/cm at room temperature.

In certain embodiments, the reactive additive (reactive liquid electrolyte composition) comprises a polymerizable first liquid solvent and an optional second liquid solvent (e.g., an ionic liquid) and wherein the second liquid solvent either is not polymerizable or is polymerizable but polymerized to a lesser extent as compared to the first liquid solvent. The presence of this second liquid solvent is designed to impart certain desired properties to the polymerized electrolyte, such as improved lithium ion conductivity, flame retardancy, and the ability of the electrolyte to permeate into the electrode (anode and/or cathode) to properly wet the surfaces of the anode active material and/or the cathode active material.

The second liquid solvent may further comprise an organic liquid selected from a fluorinated carbonate, hydrofluoroether, fluorinated ester, sulfone, nitrile, phosphate, phosphite, alkyl phosphonate, phosphazene, sulfate, siloxane, silane, 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, dimethyl carbonate (DMC), methylethyl carbonate (MEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), or a combination thereof.

The first or the second liquid solvents may include fluorinated monomers having unsaturation (double bonds or triple bonds that can be opened up for polymerization); e.g., fluorinated vinyl carbonates, fluorinated vinyl monomers, fluorinated esters, fluorinated vinyl esters, and fluorinated vinyl ethers). Fluorinated vinyl esters include $R_fCO_2CH=CH_2$ and Propenyl Ketones, $R_fCOCH=CHCH_3$, where Rr is F or any F-containing functional group (e.g., $CF_2$— and $CF_2CF_3$—).

Two examples of fluorinated vinyl carbonates are given below:

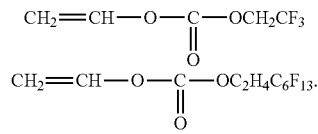

These liquid solvents can be cured in the presence of an initiator (e.g., 2-Hydroxy-2-methyl-1-phenyl-propan-1-one, Ciba DAROCUR-1173, which can be activated by UV or electron beam) if so desired:

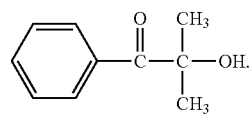

In some embodiments, the fluorinated carbonate is selected from vinyl- or double bond-containing variants of fluoroethylene carbonate (FEC), DFDMEC, FNPEC, hydrofluoro ether (HFE), trifluoro propylene carbonate (FPC), methyl nonafluorobutyl ether (MFE), or a combination thereof, wherein the chemical formulae for FEC, DFDMEC, and FNPEC, respectively are shown below:

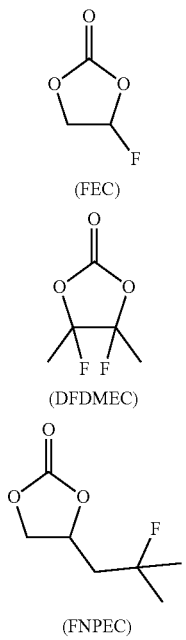

Desirable sulfones as a first or second liquid solvent include, but not limited to, alkyl and aryl vinyl sulfones or sulfides; e.g., ethyl vinyl sulfide, allyl methyl sulfide, phenyl vinyl sulfide, phenyl vinyl sulfoxide, ethyl vinyl sulfone, allyl phenyl sulfone, allyl methyl sulfone, and divinyl sulfone:

Simple alkyl vinyl sulfones, such as ethyl vinyl sulfone, may be polymerized via emulsion and bulk methods. Propyl vinyl sulfone may be polymerized by alkaline persulfate initiators to form soft polymers. It may be noted that aryl vinyl sulfone, e.g., naphthyl vinyl sulfone, phenyl vinyl sulfone, and parra-substituted phenyl vinyl sulfone (R=NH$_2$, NO$_2$ or Br), were reported to be unpolymerizable with free-radical initiators. However, we have observed that phenyl and methyl vinyl sulfones can be polymerized with several anionic-type initiators. Effective anionic-type catalysts or initiators are n-BuLi, ZnEt2, LiN(CH$_2$)$_2$, NaNH$_2$, and complexes of n-LiBu with ZnEt2 or AlEh. A second solvent, such as pyridine, sulfolane, toluene or benzene, can be used to dissolve alkyl vinyl sulfones, aryl vinyl sulfones, and other larger sulfone molecules.

Poly(sulfone)s have high oxygen indices and low smoke emission on burning. Poly(sulfone)s are inherently self-extinguishing materials owing to their highly aromatic character. In certain embodiments, the sulfone as a first or the second liquid solvent is selected from TrMS, MTrMS, TMS, or vinyl or double bond-containing variants of TrMS, MTrMS, TMS, EMS, MMES, EMES, EMEES, or a combination thereof; their chemical formulae being given below:

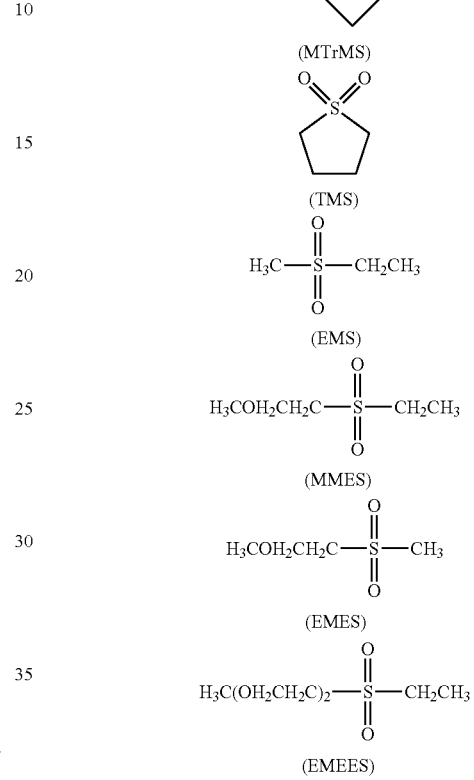

The cyclic structure, such as TrMS, MTrMS, and TMS, can be polymerized via ring-opening polymerization with the assistance of an ionic type initiator.

The first or the second liquid solvent may be a nitrile preferably selected from dinitriles, such as AND, GLN, and SEN, which have the following chemical formulae:

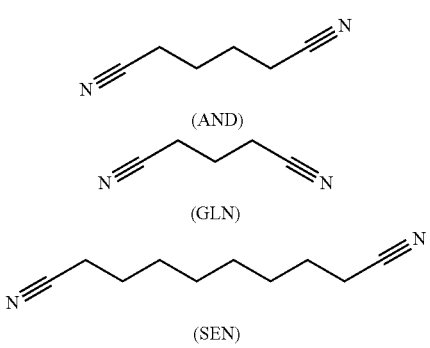

In some embodiments, the phosphate, phosphonate, phosphazene, phosphite, or sulfate, as a first liquid solvent or in the second liquid solvent, is selected from tris(trimethylsilyl) phosphite (TTSPi), alkyl phosphate, triallyl phosphate (TAP), ethylene sulfate (DTD), a combination thereof. The phosphate, alkyl phosphonate, or phosphazene may be selected from the following:

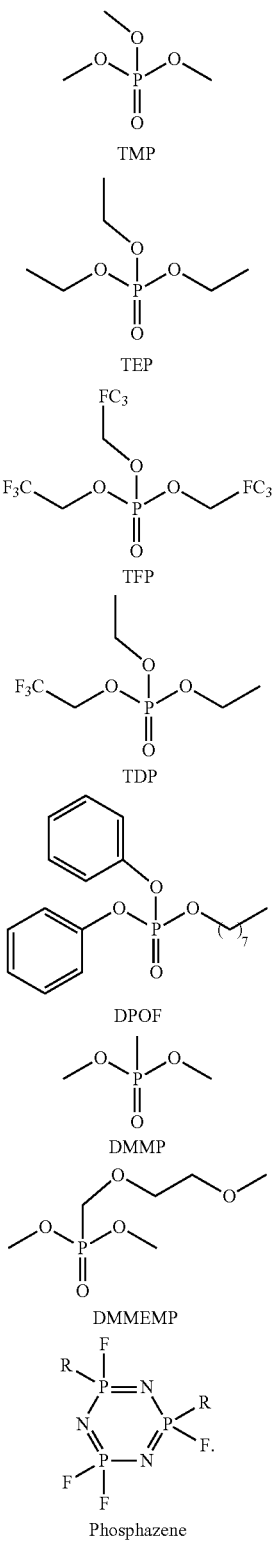

The phosphate, alkyl phosphonate, phosphonic acid, and phosphazene are flame-resistant. Good examples include diethyl vinylphosphonate, dimethyl vinylphosphonate, vinylphosphonic acid, diethyl allyl phosphate, and diethyl allylphosphonate:

The siloxane or silane in the second liquid solvent may be selected from alkylsiloxane (Si—O), alkyylsilane (Si—C), liquid oligomeric silaxane (—Si—O—Si—), or a combination thereof.

The reactive additive may further comprise an amide group selected from N,N-dimethylacetamide, N,N-diethylacetamide, N,N-dimethylformamide, N,N-diethylformamide, or a combination thereof.

In certain embodiments, the crosslinking agent comprises a compound having at least one reactive group selected from a hydroxyl group, an amino group, an imino group, an amide group, an acrylic amide group, an amine group, an acrylic group, an acrylic ester group, or a mercapto group in the molecule.

In certain embodiments, the crosslinking agent is selected from poly(diethanol) diacrylate, poly(ethyleneglycol)dimethacrylate, poly(diethanol) dimethylacrylate, poly(ethylene glycol)diacrylate, lithium hexafluorophosphate (LiPF$_6$), lithium borofluoride (LiBF$_4$), lithium hexafluoroarsenide (LiAsF$_6$), lithium trifluoro-metasulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium oxalyldifluoroborate (LiBF$_2$C$_2$O$_4$), or a combination thereof.

The initiator may be selected from an azo compound (e.g., azodiisobutyronitrile, AIBN), azobisisobutyronitrile, azobisisoheptonitrile, dimethyl azobisisobutyrate, benzoyl peroxide tert-butyl peroxide and methyl ethyl ketone peroxide, benzoyl peroxide (BPO), bis(4-tert-butylcyclohexyl)peroxydicarbonate, t-amyl peroxypivalate, 2,2'-azobis-(2,4-dimethylvaleronitrile), 2,2'-azobis-(2-methylbutyronitrile), 1,1-azobis(cyclohexane-1-carbonitrile, benzoylperoxide (BPO), hydrogen peroxide, dodecamoyl peroxide, isobutyryl peroxide, cumene hydroperoxide, tert-butyl peroxypivalate, diisopropyl peroxydicarbonate, or a combination thereof.

In the disclosed polymer electrolyte, the lithium salt may be selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-metasulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium oxalyldifluoroborate (LiBF$_2$C$_2$O$_4$), lithium nitrate (LiNO$_3$), Li-Fluoroalkyl-Phosphates (LiPF$_3$(CF$_2$CF$_3$)$_3$), lithium bisperfluoro-ethysulfonylimide (LiBETI), lithium bis(trifluoromethanesulphonyl)imide, lithium bis(fluorosulphonyl)imide, lithium trifluoromethanesulfonimide (LiTFSI), an ionic liquid lithium salt, or a combination thereof.

The cathode in the disclosed lithium cell typically comprises particles of a cathode active material and the electrolyte permeates into the cathode to come in physical contact with substantially all the cathode active material particles.

In some preferred embodiments, the battery cell contains substantially no liquid solvent left therein (substantially >99% of the liquid solvent being polymerized to become a polymer). However, it is essential to initially include a liquid solvent in the cell, enabling the lithium salt to get dissociated into lithium ions and anions. A majority (>50%, preferably >70%) or substantially all of the liquid solvents is then cured (polymerized or crosslinked). With less than 1% liquid solvent, the resulting electrolyte is a solid-state electrolyte. With less than 30% liquid solvent, we have a quasi-solid electrolyte. Both are highly flame-resistant.

A lower proportion of the liquid solvent in the electrolyte leads to a significantly reduced vapor pressure and increased flash point or completely eliminated flash point (un-detectable). Although typically by reducing the liquid solvent proportion one tends to observe a reduced lithium ion conductivity for the resulting electrolyte; however, quite surprisingly, after a threshold liquid solvent fraction, this trend is diminished or reversed (the lithium ion conductivity can actually increase with reduced liquid solvent in some cases).

The crosslinking agent preferably comprises a compound having at least one reactive group selected from a hydroxyl group, an amino group, an imino group, an amide group, an amine group, an acrylic group, or a mercapto group in the molecule. In some desired embodiments, the crosslinking agent may be selected from a chemical species represented by Chemical formula 1 below:

(Chemical Formula 1)

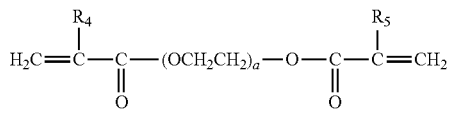

where $R_4$ and $R_5$ are each independently hydrogen or methyl group, and n is an integer from 3 to 30, wherein R' is $C_1$-$C_5$ alkyl group.

In some embodiments, the crosslinking agent may be selected from N,N-methylene bisacrylamide, epichlorohydrin, 1,4-butanediol diglycidyl ether, tetrabutylammonium hydroxide, cinnamic acid, ferric chloride, aluminum sulfate octadecahydrate, diepoxy, dicarboxylic acid compound, poly(potassium 1-hydroxy acrylate) (PKHA), glycerol diglycidyl ether (GDE), ethylene glycol, polyethylene glycol, polyethylene glycol diglycidyl ether (PEGDE), citric acid, acrylic acid, methacrylic acid, a derivative compound of acrylic acid, a derivative compound of methacrylic acid, glycidyl functions, N,N'-Methylenebisacrylamide (MBAAm), Ethylene glycol dimethacrylate (EGDMAAm), isobornyl methacrylate, poly (acrylic acid) (PAA), methyl methacrylate, isobornyl acrylate, ethyl methacrylate, isobutyl methacrylate, n-Butyl methacrylate, ethyl acrylate, 2-Ethyl hexyl acrylate, n-Butyl acrylate, a diisocyanate, an urethane chain, a chemical derivative thereof, or a combination thereof.

The polymer in the electrolyte may form a mixture, copolymer, semi-interpenetrating network, or simultaneous interpenetrating network with a second polymer selected from poly(ethylene oxide), polypropylene oxide, poly(ethylene glycol), poly(acrylonitrile), poly(methyl methacrylate), poly(vinylidene fluoride), poly bis-methoxy ethoxyethoxide-phosphazenex, polyvinyl chloride, polydimethylsiloxane, poly(vinylidene fluoride)-hexafluoropropylene (PVDF-HFP), cyanoethyl poly(vinyl alcohol), a pentaerythritol tetraacrylate-based polymer, an aliphatic polycarbonate, a single Li-ion conducting solid polymer electrolyte with a carboxylate anion, a sulfonylimide anion, or sulfonate anion, a crosslinked electrolyte of poly(ethylene glycol) diacrylate or poly(ethylene glycol) methyl ether acrylate, a sulfonated derivative thereof, or a combination thereof. This second polymer may be pre-mixed into an anode and/or a cathode. Alternatively, this second polymer may be dissolved in the liquid solvent where appropriate or possible to form a solution prior to being injected into the battery cell.

In certain desirable embodiments, the electrolyte further comprises particles of an inorganic solid electrolyte material having a particle size from 2 nm to 30 μm, wherein the particles of inorganic solid electrolyte material are dispersed in the polymer or chemically bonded by the polymer. The particles of inorganic solid electrolyte material are preferably selected from an oxide type, sulfide type, hydride type, halide type, borate type, phosphate type, lithium phosphorus oxynitride (LiPON), garnet-type, lithium superionic conductor (LISICON) type, sodium superionic conductor (NASICON) type, or a combination thereof. Such a composite composition is of particular utility value for use as a solid electrolyte separator disposed between an anode and a cathode.

The rechargeable lithium cell may further comprise a separator disposed between the anode and the cathode. Preferably, the separator comprises a quasi-solid or solid-state electrolyte as herein disclosed.

The separator may comprise the presently disclosed electrolyte. In certain embodiments, the separator comprises polymeric fibers, ceramic fibers, glass fibers, or a combination thereof. These fibers may be stacked together in such a manner that there are pores that allow for permeation of lithium ions, but not for penetration of any potentially formed lithium dendrites. These fibers may be dispersed in a matrix material or bonded by a binder material. This matrix or binder material may contain a ceramic or glass material. The polymer electrolyte may serve as the matrix material or binder material that helps to hold these fibers together. The separator may contain particles of a glass or ceramic material (e.g., metal oxide, metal carbide, metal nitride, metal boride, etc.).

The present disclosure further provides a rechargeable lithium battery, including a lithium metal secondary cell, a lithium-ion cell, a lithium-sulfur cell, a lithium-ion sulfur cell, a lithium-selenium cell, or a lithium-air cell. This battery features a non-flammable, safe, and high-performing electrolyte as herein disclosed.

The polymerizable first liquid solvent in the reactive additive or electrolyte composition may be initially in a liquid monomer state, which can be injected into an electrode (e.g., a cathode) or a battery cell and then cured (polymerized and/or crosslinked) in situ inside the electrode or the cell.

Alternatively, the reactive liquid solvent electrolyte composition (comprising the needed lithium salt and an initiator and/or a crosslinking agent) may be mixed with an electrode active material (e.g., cathode active material particles, such as NCM, NCA and lithium iron phosphate), a conducting additive (e.g., carbon black, carbon nanotubes, expanded graphite flakes, or graphene sheets), and an optional flame-retardant agent and/or optional particles of an inorganic solid electrolyte to form a reactive slurry or paste. The slurry or paste is then made into a desired electrode shape (e.g., cathode electrode), possibly supported on a surface of a current collector (e.g., an Al foil as a cathode current collector). An anode of a lithium-ion cell may be made in a similar manner using an anode active material (e.g., particles of graphite, Si, SiO, etc.). The anode electrode, a cathode electrode, and an optional separator are then combined to form a battery cell. The reactive solvent inside the cell is then polymerized and/or crosslinked in situ inside the battery cell.

The electrolyte composition is designed to permeate into the internal structure of the cathode and to be in physical contact or ionic contact with the cathode active material in the cathode, and to permeate into the anode electrode to be in physical contact or ionic contact with the anode active material where/if present.

The flash point of the quasi-solid electrolyte is typically at least 100 degrees higher than the flash point of the same organic liquid solvent without being polymerized. In most of the cases, either the flash point is higher than 200° C. or no flash point can be detected. The electrolyte just would not catch on fire or get ignited. Any accidentally initiated flame does not sustain for longer than a few seconds. This is a highly significant discovery, considering the notion that fire and explosion concern has been a major impediment to widespread acceptance of battery-powered electric vehicles. This new technology could potentially reshape the landscape of EV industry.

Still another preferred embodiment of the present disclosure is a rechargeable lithium-sulfur cell or lithium-ion sulfur cell containing a sulfur cathode having sulfur or lithium polysulfide as a cathode active material.

For a lithium metal cell (where lithium metal is the primary active anode material), the anode current collector may comprise a foil, perforated sheet, or foam of a metal having two primary surfaces wherein at least one primary surface is coated with or protected by a layer of lithiophilic metal (a metal capable of forming a metal-Li solid solution or is wettable by lithium ions), a layer of graphene material, or both. The metal foil, perforated sheet, or foam is preferably selected from Cu, Ni, stainless steel, Al, graphene-coated metal, graphite-coated metal, carbon-coated metal, or a combination thereof. The lithiophilic metal is preferably selected from Au, Ag, Mg, Zn, Ti, K, Al, Fe, Mn, Co, Ni, Sn, V, Cr, an alloy thereof, or a combination thereof.

For a lithium ion battery featuring the presently disclosed electrolyte, there is no particular restriction on the selection of an anode active material. The anode active material may be selected from the group consisting of: (a) silicon (Si), germanium (Ge), tin (Sn), lead (Pb), antimony (Sb), phosphorus (P), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium titanium niobate, lithium-containing titanium oxide, lithium transition metal oxide, $ZnCo_2O_4$; (f) carbon or graphite particles (g) prelithiated versions thereof; and (h) combinations thereof.

In some embodiments, the anode active material contains a prelithiated Si, prelithiated Ge, prelithiated Sn, prelithiated $SnO_x$, prelithiated $SiO_x$, prelithiated iron oxide, prelithiated $V_2O_5$, prelithiated $V_3O_8$, prelithiated $Co_3O_4$, prelithiated $Ni_3O_4$, or a combination thereof, wherein x=1 to 2.

The rechargeable lithium cell may further comprise a cathode current collector selected from aluminum foil, carbon- or graphene-coated aluminum foil, stainless steel foil or web, carbon- or graphene-coated steel foil or web, carbon or graphite paper, carbon or graphite fiber fabric, flexible graphite foil, graphene paper or film, or a combination thereof. A web means a screen-like structure or a metal foam, preferably having interconnected pores or through-thickness apertures.

The present disclosure also provides a reactive electrolyte composition comprising (i) a first liquid solvent that is polymerizable, (ii) an initiator or curing agent, (iii) a lithium salt, and (iv) a second liquid solvent comprising an ionic liquid; wherein the first liquid solvent occupies from 1% to 99% by weight and the second solvent occupies from 0.1% to 99% by weight based on the total weight of the reactive electrolyte composition; wherein the first liquid solvent has a lower flash point, a higher vapor pressure, or a higher solubility of the lithium salt as compared with the second liquid solvent.

In this reactive electrolyte composition, the first liquid solvent is preferably selected from vinylene carbonate, ethylene carbonate, fluoro-ethylene carbonate, vinyl sulfite, vinyl ethylene sulfite, vinyl ethylene carbonate, 1,3-propyl sultone, 1,3-acrylic-sultones, methyl ethylene sulfone, methyl vinyl sulfone, ethyl vinyl sulfone, methyl methacrylate, vinyl acetate, acrylamide, 1,3-dioxolane (DOL), a fluorinated vinyl carbonate, fluorinated vinyl monomer, fluorinated ester, fluorinated vinyl ester, fluorinated vinyl ether, or a combination thereof.

The second liquid solvent in this reactive electrolyte composition is preferably selected from the group consisting of fluorinated ethers, fluorinated esters, sulfones, sulfides, nitriles, sulfates, siloxanes, silanes, combinations thereof, and combinations with phosphates, phosphonates, phosphinates, phosphines, phosphine oxides, phosphonic acids, phosphorous acid, phosphites, phosphoric acids, phosphazene compounds, derivatives thereof, and combinations thereof.

The present disclosure also provides a method of producing the disclosed rechargeable lithium cell, the method comprising: (a) combining an anode, an optional separator layer, a cathode, and a protective housing to form a cell; (b) introducing a reactive liquid electrolyte composition into the cell, wherein the reactive liquid electrolyte composition comprises at least a polymerizable first liquid solvent, a lithium salt dissolved in the first liquid solvent, a crosslinking agent and/or an initiator, and a second liquid solvent, wherein the first liquid solvent occupies from 1% to 99% by weight and the second liquid solvent occupies from 0.1% to 99% by weight based on the total weight of the reactive liquid electrolyte composition and the first liquid solvent has a lower flash point (higher flammability), a higher vapor pressure, a higher dielectric constant, or a higher solubility of the lithium salt as compared with the second liquid solvent; and (c) partially or totally polymerizing the first liquid solvent to obtain a quasi-solid or solid-state electrolyte wherein from 30% to 100% by weight of the polymerizable first liquid solvent is polymerized.

Preferably, the first liquid solvent is selected from the group consisting of vinylene carbonate, ethylene carbonate, fluoroethylene carbonate, vinyl sulfite, vinyl ethylene sulfite, vinyl ethylene carbonate, 1,3-propyl sultone, 1,3,5-trioxane (TXE), 1,3-acrylic-sultones, methyl ethylene sulfone, methyl vinyl sulfone, ethyl vinyl sulfone, methyl methacrylate, vinyl acetate, acrylamide, 1,3-dioxolane (DOL), fluorinated ethers, fluorinated esters, sulfones, sulfides, dinitriles, acrylonitrile (AN), sulfates, siloxanes, silanes, N-methylacetamide, acrylates, ethylene glycols, phosphates, phosphonates, phosphinates, phosphines, phosphine oxides, phosphonic acids, phosphorous acid, phosphites, phosphoric acids, phosphazene compounds, derivatives thereof, and combinations thereof.

Preferably, Step (c) either does not polymerize the second liquid solvent or polymerizes the second liquid solvent to a different extent as compared to the polymerizable first liquid solvent.

The disclosure further provides a method of producing the rechargeable lithium cell, the method comprising: (A) mixing particles of a cathode active material, an optional conductive additive, an optional binder, and a reactive additive to form a cathode, wherein the reactive additive comprises (i) a first liquid solvent that is polymerizable, (ii) an initiator or curing agent, (iii) a lithium salt, and (iv) a second liquid solvent comprising an ionic liquid; wherein the first liquid solvent occupies from 1% to 99% by weight based on the total weight of the reactive additive and wherein the first liquid solvent has a lower flash point, a higher vapor pressure, or a higher solubility of the lithium salt as compared with the second liquid solvent; (B) providing an anode; (C) combining the cathode, a separator, and the anode to form a cell; and (D) partially or totally polymerizing the first solvent, prior to or after step (C), to produce the rechargeable lithium cell, wherein at least 30% by weight of the first liquid solvent is polymerized.

In some embodiments, step (B) comprises a procedure of mixing particles of an anode active material, an optional conductive additive, an optional binder, a reactive additive, and a lithium salt to form an anode, wherein the reactive additive comprises at least a polymerizable liquid solvent, a crosslinking agent or initiator, and a second liquid solvent and wherein the method further comprises polymerizing and/or crosslinking the reactive additive, prior to or after step (C), to produce the rechargeable lithium cell. Step (A) may further comprise adding particles of an inorganic solid electrolyte powder in the cathode or in the anode.

For all the methods, the first liquid solvent and the second liquid solvent typically are polymerized and/or crosslinked to different extents even under the same conditions. The second liquid solvent may be chosen to be non-polymerizable.

The procedure of polymerizing and/or crosslinking may comprise exposing the reactive additive to heat, UV, high-energy radiation, or a combination thereof. The high-energy radiation may be selected from electron beam, Gamma radiation, X-ray, neutron radiation, etc. Electron beam irradiation is particularly useful.

These and other advantages and features of the present disclosure will become more transparent with the description of the following best mode practice and illustrative examples.

BRIEF DESCRIPTION OF THE DRAWINGS

FIG. 2(A) Structure of an anode-less lithium metal cell (as manufactured or in a discharged state) according to some embodiments of the present disclosure;

FIG. 2(B) Structure of an anode-less lithium metal cell (in a charged state) according to some embodiments of the present disclosure.

DETAILED DESCRIPTION

Figure 1A:
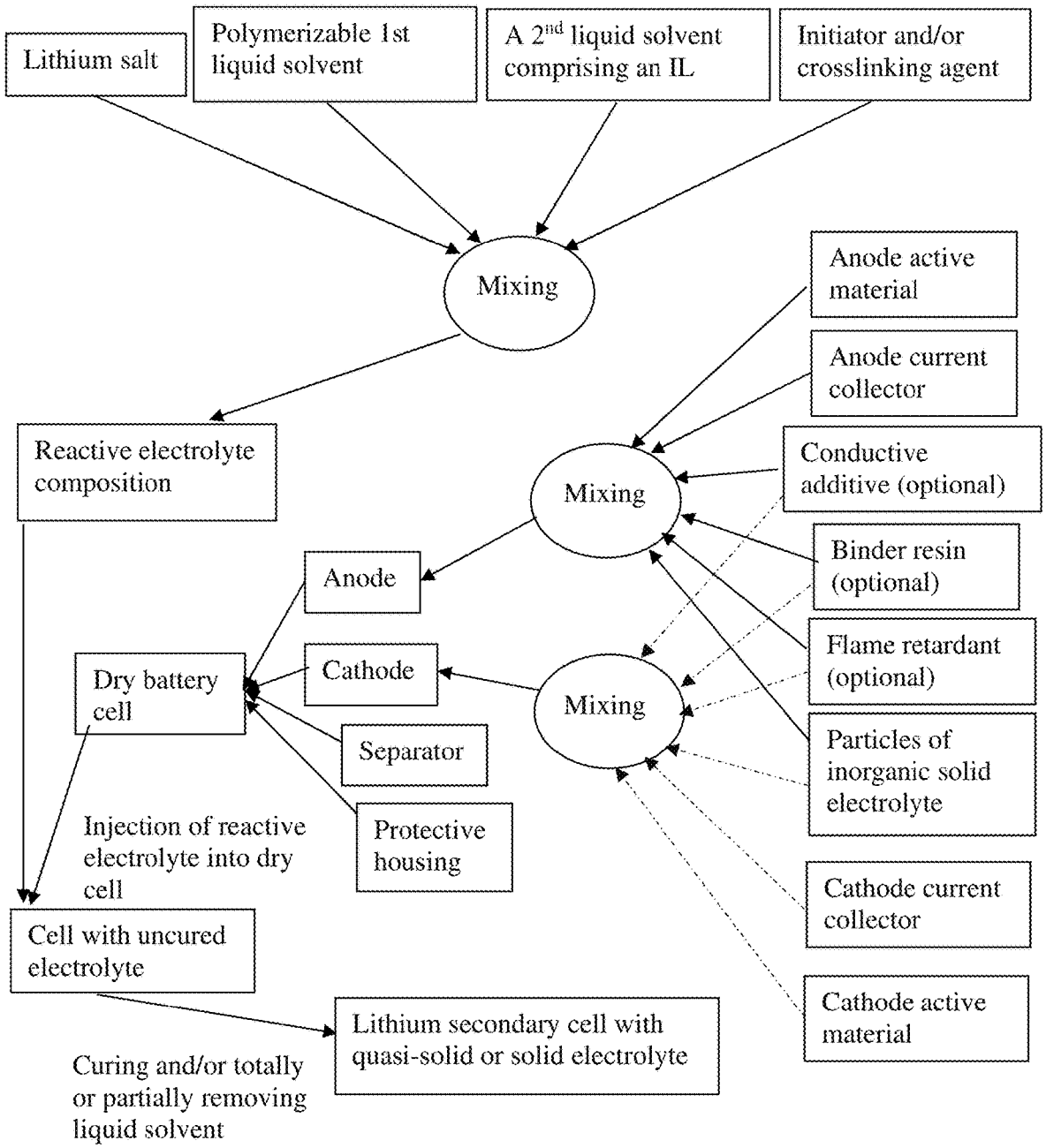
FIG. 1(A) A process flow chart to illustrate a method of producing a lithium metal battery comprising a substantially solid-state electrolyte (all solid-state and quasi-solid electrolytes) according to some embodiments of the present disclosure.

The present disclosure provides a safe and high-performing lithium battery, which can be any of various types of lithium-ion cells or lithium metal cells. A high degree of safety is imparted to this battery by a novel and unique electrolyte that is highly flame-resistant and would not initiate a fire or sustain a fire and, hence, would not pose explosion danger. This disclosure has solved the very most critical issue that has plagued the lithium-metal and lithium-ion industries for more than two decades.

As indicated earlier in the Background section, a strong need exists for a safe, non-flammable, yet injectable quasi-solid electrolyte or solid-state electrolyte system for a rechargeable lithium cell that is compatible with existing battery production facilities. It is well-known in the art that the conventional solid-state electrolyte batteries typically cannot be produced using existing lithium-ion battery production equipment or processes.

The present disclosure provides a rechargeable lithium battery comprising an anode, a cathode, and a hybrid quasi-solid or solid-state electrolyte in ionic communication with the anode and the cathode, wherein the hybrid electrolyte, having a lithium ion conductivity approximately from $10^{-5}$ S/cm to $5 \times 10^{-2}$ S/cm, comprises particles of an inorganic solid electrolyte (ISE) material dispersed in or bonded by a polymer, which is a polymerization or crosslinking product of a reactive additive, wherein the reactive additive comprises (i) a first liquid solvent that is polymerizable, (ii) an initiator or curing agent, (iii) a lithium salt, and (iv) an optional second liquid solvent (e.g., the second liquid solvent comprising an ionic liquid, preferably a room temperature ionic liquid); wherein the first liquid solvent occupies from 1% to 99% by weight and the second liquid electrolyte occupies from 0.1% to 99% by weight based on the total weight of the reactive additive; and wherein the polymer alone or the hybrid electrolyte is present in the anode, the cathode, the separator, between the anode and the separator, or between the cathode and the separator.

Preferably, at least 20% by weight of the polymerizable first liquid solvent is polymerized; more preferably >50%, further preferably >70%, and most preferably >99% is polymerized. The ISE-to-polymer electrolyte volume ratio can be from 1/99 to 99/1, but typically from 5/95 to 95/5, more typically from 10/90 to 90/10, further more typically from 20/80 to 80/20, and most typically from 30/70 to 70/30. Preferably, the first liquid solvent has a lower flash point (higher flammability), a higher vapor pressure, or a higher solubility of the lithium salt as compared with the second liquid solvent;

In certain embodiments, the particles of an inorganic solid electrolyte material have a particle size from 2 nm to 30 μm and are dispersed in the polymer or chemically bonded by the polymer. The particles of inorganic solid electrolyte material are preferably selected from an oxide type, sulfide type, hydride type, halide type, borate type, phosphate type, lithium phosphorus oxynitride (LiPON), garnet-type, lithium superionic conductor (LISICON) type, sodium superionic conductor (NASICON) type, or a combination thereof.

The inorganic solid electrolyte particles that can be incorporated into the hybrid electrolyte include, but are not limited to, perovskite-type. NASICON-type, garnet-type and sulfide-type materials. A representative and well-known perovskite solid electrolyte is $Li_{3x}La_{2/3-x}TiO_3$, which exhibits a lithium-ion conductivity exceeding $10^{-3}$ S/cm at room temperature. This material has been deemed unsuitable in lithium batteries because of the reduction of Ti on contact with lithium metal. However, we have found that this material, when dispersed in a polymer, does not suffer from this problem.

The sodium superionic conductor (NASICON)-type compounds include a well-known $Na_{1+x}Zr_2Si_xP_{3-x}O_{12}$. These materials generally have an $AM_2(PO_4)_3$ formula with the A site occupied by Li, Na or K. The M site is usually occupied by Ge, Zr or Ti. In particular, the $LiTi_2(PO_4)_3$ system has been widely studied as a solid-state electrolyte for the lithium-ion battery. The ionic conductivity of $LiZr_2(PO_4)_3$ is very low, but can be improved by the substitution of Hf or Sn. This can be further enhanced with substitution to form $Li_{1+x}M_xTi_{2-x}(PO_4)_3$ (M=Al, Cr, Ga. Fe, Sc, In, Lu, Y or La). Al substitution has been demonstrated to be the most effective solid-state electrolyte. The $Li_{1+x}Al_xGe_{2-x}(PO_4)_3$ system is also an effective solid state due to its relatively wide electrochemical stability window. NASICON-type materials are considered as suitable solid electrolytes for high-voltage solid electrolyte batteries.

Garnet-type materials have the general formula $A_3B_2Si_3O_{12}$, in which the A and B cations have eightfold and sixfold coordination, respectively. In addition to $Li_3M_2Ln_3O_{12}$ (M=W or Te), a broad series of garnet-type materials may be used as an additive, including $Li_5La_3M_2O_{12}$ (M=Nb or Ta), $Li_6ALa_2M_2O_{12}$ (A=Ca, Sr or Ba; M=Nb or Ta), $Li_{5.5}La_3M_{1.75}B_{0.25}O_{12}$ (M=Nb or Ta; B=In or Zr) and the cubic systems $Li_7La_3Zr_2O_{12}$ and $Li_{7.06}M_3Y_{0.06}Zr_{1.94}O_{12}$ (M=La, Nb or Ta). The $Li_{6.5}La_3Zr_{1.75}Te_{0.25}O_{12}$ compounds have a high ionic conductivity of $1.02 \times 10^{-3}$ S/cm at room temperature.

The sulfide-type solid electrolytes include the $Li_2S$—$SiS_2$ system. The conductivity in this type of material is $6.9 \times 10^{-4}$ S/cm, which was achieved by doping the $Li_2S$—$SiS_2$ system with $Li_3PO_4$. Other sulfide-type solid-state electrolytes can reach a good lithium-ion conductivity close to $10^{-2}$ S/cm. The sulfide type also includes a class of thio-LISICON (lithium superionic conductor) crystalline material represented by the $Li_2S$—$P_2S_5$ system. The chemical stability of the $Li_2S$—$P_2S_5$ system is considered as poor, and the material is sensitive to moisture (generating gaseous $H_2S$). The stability can be improved by the addition of metal oxides. The stability is also significantly improved if the $Li_2S$—$P_2S_5$ material is dispersed in an elastic polymer.

These inorganic solid electrolyte (ISE) particles dispersed in an electrolyte polymer can help enhance the lithium ion conductivity of certain polymers that have a lower ion conductivity. Preferably and typically, the polymer electrolyte (with or with an uncured solvent) has a lithium ion conductivity no less than $10^{-5}$ S/cm, more preferably no less than $10^{-4}$ S/cm, further preferably no less than $10^{-3}$ S/cm, and most preferably no less than $10^{-2}$ S/cm.

It should be noted that certain inorganic solid electrolytes (e.g., sulfide type ISE) can have a higher lithium-ion conductivity as compared to certain selected in situ curable polymers. However, it would normally take a large proportion of the particles of an inorganic solid electrolyte (e.g., >50% by volume) to reach a contiguous phase in an anode or a cathode. This implies that the proportion of an active material (responsible for storing lithium ions) would be significantly reduced (e.g., less than 50%), hence, resulting in an undesirably low energy density. To overcome such a design deficiency, we choose to implement a smaller fraction of a highly ion conducting ISE (e.g., 3%-25% vs. 25-50% by volume relative to the volume of an entire electrode) when an electrode (anode or cathode) is made. In this situation, the ISE particles alone do not constitute a contiguous phase (continuous or contiguous ion-conducting pathways). However, we can achieve a contiguous phase by combining ISE particles and a polymerizable liquid electrolyte; the liquid electrolyte being capable of permeating into the electrode, wetting surfaces of the ISE particles, and ionically connecting isolated ISE particles together. The liquid electrolyte (having a lithium salt dissolved in a liquid solvent) is then cured (polymerized and/or crosslinked) after the electrode is made or after the battery cell is produced. Such a strategy enables the formation of a contiguous electrolyte phase (allowing lithium ions to reach all the electrode active material particles) with a minimal fraction of electrolyte (hence, higher proportion of the desired active material and higher energy density).

In certain embodiments, the first liquid solvent is selected from the group consisting of vinylene carbonate, ethylene carbonate, fluoroethylene carbonate, vinyl sulfite, vinyl ethylene sulfite, vinyl ethylene carbonate, 1,3-propyl sultone, 1,3,5-trioxane (TXE), 1,3-acrylic-sultones, methyl ethylene sulfone, methyl vinyl sulfone, ethyl vinyl sulfone, methyl methacrylate, vinyl acetate, acrylamide, 1,3-dioxolane (DOL), fluorinated ethers, fluorinated esters, sulfones, sulfides, dinitriles, acrylonitrile (AN), sulfates, siloxanes, silanes, N-methylacetamide, acrylates, ethylene glycols, phosphates, phosphonates, phosphinates, phosphines, phosphine oxides, phosphonic acids, phosphorous acid, phosphites, phosphoric acids, phosphazene compounds, ionic liquids, derivatives thereof, and combinations thereof. The optional second liquid solvent may comprise an ionic liquid.

The ionic liquid is typically composed of ions only. Ionic liquids are low melting temperature salts that are in a molten or liquid state when above a desired temperature. For instance, an ionic salt is considered as an ionic liquid if its melting point is below 100° C. If the melting temperature is equal to or lower than room temperature (25° C.), the salt is referred to as a room temperature ionic liquid (RTIL). The IL-based lithium salts are characterized by weak interactions, due to the combination of a large cation and a charge-delocalized anion. This results in a low tendency to crystallize due to flexibility (anion) and asymmetry (cation).

Some ILs may be used as a co-solvent (not as a salt) to work with the first organic solvent of the present disclosure. A well-known ionic liquid is formed by the combination of a 1-ethyl-3-methyl-imidazolium (EMI) cation and an N,N-bis(trifluoromethane)sulphonamide (TFSI) anion. This combination gives a fluid with an ionic conductivity comparable to many organic electrolyte solutions, a low decomposition propensity and low vapor pressure up to ~300-400° C. This implies a generally low volatility and non-flammability and, hence, a much safer electrolyte solvent for batteries.

Ionic liquids are basically composed of organic or inorganic ions that come in an unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide and hexafluorophosphate as anions. Useful ionic liquid-based lithium salts (not solvent) may be composed of lithium ions as the cation and bis(trifluoromethanesulphonyl)imide, bis(fluorosulphonyl)imide and hexafluorophosphate as anions. For instance, lithium trifluoromethanesulfonimide (LiTFSI) is a particularly useful lithium salt.

Based on their compositions, ionic liquids come in different classes that include three basic types: aprotic, protic and zwitterionic types, each one suitable for a specific application. Common cations of room temperature ionic liquids (RTILs) include, but are not limited to, tetraalkylammonium, di, tri, and tetra-alkylimidazolium, alkylpyridinium, dialkyl-pyrrolidinium, dialkylpiperidinium, tetraalkylphosphonium, and trialkylsulfonium. Common anions of RTILs include, but are not limited to, $BF_4^-$, $B(CN)_4^-$, $CH_3BF_3^-$, $CH_2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte co-solvent in a rechargeable lithium cell.

In the conventional lithium-ion battery or lithium metal battery industry, the first liquid solvents listed above are commonly used as a solvent to dissolve a lithium salt therein and the resulting solutions are used as a liquid electrolyte. These liquid solvents are typically capable of dissolving a high amount of a lithium salt; however, they are typically highly volatile, having a low flash point and being highly flammable. Further, these liquid solvents are generally not known to be polymerizable, with or without the presence of a second liquid solvent, and a separate or different polymer or monomer is typically used in the industry to prepare a gel polymer electrolyte or solid polymer electrolyte.

It is highly advantageous to be able to polymerize the liquid solvent once the liquid electrolyte (having a lithium salt dissolved in the first liquid solvent) is injected into an electrode or into a battery cell. The lithium salt is readily dissociated into lithium ions and corresponding anions, which could remain separated and dispersed in a matrix of polymer chains. With such an innovative strategy, one can readily reduce the liquid solvent or completely eliminate the volatile liquid solvent all together. A desired amount of a second liquid solvent, containing an ionic liquid or a flame-resistant liquid solvent, may be retained in the battery cell to improve the lithium ion conductivity of the electrolyte. Desirable flame retardant-type liquid solvents are, as examples, alkyl phosphates, alkyl phosphonates, phosphazenes, hydrofluoroethers, fluorinated ethers, and fluorinated esters.

This strategy enables us to achieve several desirable features of the resultant hybrid electrolytes and batteries:
a) no liquid electrolyte leakage issue (the in situ cured polymer being capable of holding any remaining liquid together to form a gel or solvent-in-polymer state);
b) adequate lithium salt amount can be dissolved in the polymer electrolyte, enabling a good lithium ion conductivity;
c) reduced or eliminated flammability (only a hybrid ISE/polymer solid and an optional non-flammable second liquid are retained in the cell);
d) good ability of the electrolyte to wet the surfaces of anode/cathode active materials (hence, significantly reduced interfacial impedance and internal resistance);
e) processing ease and compatibility with current lithium-ion battery production processes and equipment; and
f) enabling a high cathode active material proportion in the cathode electrode (typically 75-97%, in contrast to typically less than 75% by weight of the cathode active material when working with a conventional solid polymer electrolyte or inorganic solid electrolyte. This strategy also enables a high anode active material proportion when particles of an anode active material are used.

This disclosed in situ-cured polymer electrolyte approach is of significant utility value since most of the organic solvents are known to be volatile and flammable, posing a fire and explosion danger. Further, current solid-state electrolytes are not compatible with existing lithium-ion battery manufacturing equipment and processes.

In certain preferred embodiments, the first or the second liquid solvent comprises a flame-resisting or flame-retardant liquid selected from an organic phosphorus compound, an inorganic phosphorus compound, a halogenated derivative thereof, or a combination thereof. The organic phosphorus compound or the inorganic phosphorus compound preferably is selected from the group consisting of phosphates, phosphonates, phosphonic acids, phosphorous acids, phosphites, phosphoric acids, phosphinates, phosphines, phosphine oxides, phosphazene compounds, derivatives thereof, and combinations thereof.

In certain embodiments, the first and/or the second liquid solvent is selected from the group consisting of fluorinated ethers, fluorinated esters, sulfones, sulfides, nitriles, sulfates, siloxanes, silanes, phosphates, phosphonates, phosphinates, phosphines, phosphine oxides, phosphonic acids, phosphorous acid, phosphites, phosphoric acids, phosphazene compounds, derivatives thereof, and combinations thereof.

In some embodiments, the first or the second liquid solvent is selected from a phosphate, phosphonate, phosphinate, phosphine, or phosphine oxide having the structure of:

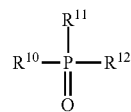

wherein $R^{10}$, $R^{11}$, and $R^{12}$, are independently selected from the group consisting of alkyl, aryl, heteroalkyl, heteroaryl, halogen substituted alkyl, halogen substituted aryl, halogen substituted heteroalkyl, halogen substituted heteroaryl, alkoxy, aryloxy, heteroalkoxy, heteroaryloxy. halogen substituted alkoxy, halogen substituted aryloxy, halogen substituted heteroalkoxy, and halogen substituted heteroaryloxy functional groups, and the second liquid solvent is stable under an applied electrical potential no less than 4 V.

In some embodiments, the first or the second liquid solvent comprises a phosphoranamine having the structure of:

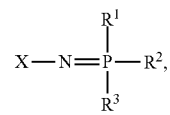

wherein $R^1$, $R^2$, and $R^3$ ae independently selected from the group consisting of alkyl, aryl, heteroalkyl, heteroaryl, halogen substituted alkyl, halogen substituted aryl, halogen substituted heteroalkyl, halogen substituted heteroaryl, alkoxy, aryloxy, heteroalkoxy, heteroaryloxy, halogen substituted alkoxy, halogen substituted aryloxy, halogen substituted heteroalkoxy, and halogen substituted heteroaryloxy functional groups, wherein $R^1$, $R^2$, and $R^3$ are represented by at least two different substituents and wherein X is selected from the group consisting of an organosiylyl group or a tert-butyl group. The $R^1$, $R^2$, and $R^3$ may be each independently selected from the group consisting of an alkoxy group, and an aryloxy group.

The polymer electrolyte typically has a lithium ion conductivity typically from $10^{-8}$ S/cm to $10^{-2}$ S/cm at room temperature. The cathode may contain a cathode active material (along with an optional conductive additive and an optional resin binder) and an optional cathode current collector (such as Al foil) supporting the cathode active material. The anode may have an anode current collector, with or without an anode active material in the beginning when the cell is made. It may be noted that if no conventional anode active material, such as graphite, Si, SiO, Sn, and conversion-type anode materials, and no lithium metal is present in the cell when the cell is made and before the cell begins to charge and discharge, the battery cell is commonly referred to as an "anode-less" lithium cell.

It may be noted that these first liquid solvents, upon polymerization, become essentially non-flammable. These liquid solvents were typically known to be useful for dissolving a lithium salt and not known for their polymerizability or their potential as an electrolyte polymer.

In some preferred embodiments, the battery cell contains substantially no volatile liquid solvent therein after polymerization. However, it is essential to initially include a liquid solvent in the cell, enabling the lithium salt to get dissociated into lithium ions and anions. A majority (>50%, preferably >70%) or substantially all of the liquid solvent (particularly the organic solvent) is then cured just before or after curing of the reactive additive. With substantially 0% liquid solvent, the resulting electrolyte is a solid-state electrolyte. With less than 30% liquid solvent, we have a quasi-solid electrolyte. Both are highly flame-resistant.

In certain embodiments, the hybrid electrolyte exhibits a vapor pressure less than 0.001 kPa when measured at 20° C., a vapor pressure less than 60% of the vapor pressure of the combined first liquid solvent and lithium salt alone prior to polymerization, a flash point at least 100 degrees Celsius higher than a flash point of the liquid solvent prior to polymerization, a flash point higher than 200° C., or no measurable flash point and wherein the polymer has a lithium ion conductivity from $10^{-8}$ S/cm to $10^{-2}$ S/cm at room temperature.

A lower proportion of the unpolymerized liquid solvent in the electrolyte leads to a significantly reduced vapor pressure and increased flash point or completely eliminated flash point (un-detectable). Although typically by reducing the liquid solvent proportion one tends to observe a reduced lithium ion conductivity for the resulting electrolyte; however, quite surprisingly, after a threshold liquid solvent fraction, this trend is diminished or reversed (the lithium ion conductivity can actually increase with reduced liquid solvent in some cases).

In certain embodiments, the reactive additive comprises a first polymerizable liquid solvent and a second liquid solvent and wherein the second liquid solvent either is not polymerizable or is polymerizable but polymerized to a lesser extent as compared to the first polymerizable liquid solvent. The presence of this second liquid solvent is designed to impart certain desired properties to the polymerized electrolyte, such as lithium ion conductivity, flame retardancy, ability of the electrolyte to permeate into the electrode (anode and/or cathode) to properly wet the surfaces of the anode active material and/or the cathode active material.

In some embodiments, the second liquid solvent is selected from a fluorinated carbonate, hydrofluoroether, fluorinated ester, sulfone, nitrile, phosphate, phosphite, alkyl phosphonate, phosphazene, sulfate, siloxane, silane, 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), or a combination thereof.

Desirable polymerizable liquid solvents can include fluorinated monomers having unsaturation (double bonds or triple bonds) in the backbone or cyclic structure (e.g., fluorinated vinyl carbonates, fluorinated vinyl monomers, fluorinated esters, fluorinated vinyl esters, and fluorinated vinyl ethers). These chemical species may also be used as a second liquid solvent in the presently disclosed electrolyte. Fluorinated vinyl esters include $R_fCO_2CH=CH_2$ and Propenyl Ketones, $R_fCOCH=CHCH_3$, where Rr is F or any F-containing functional group (e.g., $CF_2$— and $CF_2CF_3$—).

Two examples of fluorinated vinyl carbonates are given below:

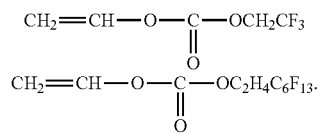

These liquid solvents, as a monomer, can be cured in the presence of an initiator (e.g., 2-Hydroxy-2-methyl-1-phenyl-propan-1-one, Ciba DAROCUR-1173, which can be activated by UV or electron beam):

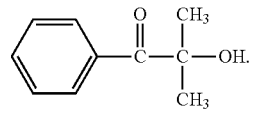

In some embodiments, the fluorinated carbonate is selected from vinyl- or double bond-containing variants of fluoroethylene carbonate (FEC), DFDMEC, FNPEC, hydrofluoro ether (HFE), trifluoro propylene carbonate (FPC), or methyl nonafluorobutyl ether (MFE), wherein the chemical formulae for FEC, DFDMEC, and FNPEC, respectively are shown below:

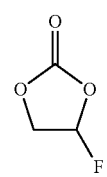
(FEC)

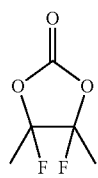
(DFDMEC)

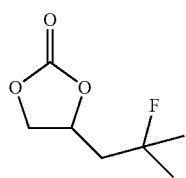
(FNPEC)

Desirable sulfones as a polymerizable first liquid solvent or as a second liquid solvent include, but not limited to, alkyl and aryl vinyl sulfones or sulfides; e.g., ethyl vinyl sulfide, allyl methyl sulfide, phenyl vinyl sulfide, phenyl vinyl sulfoxide, ethyl vinyl sulfone, allyl phenyl sulfone, allyl methyl sulfone, and divinyl sulfone.

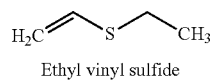
Ethyl vinyl sulfide

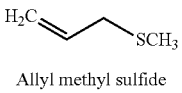
Allyl methyl sulfide

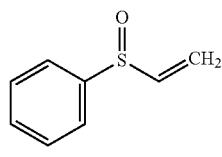
Phenyl vinyl sulfoxide

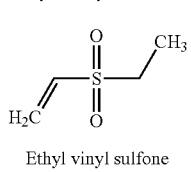
Ethyl vinyl sulfone

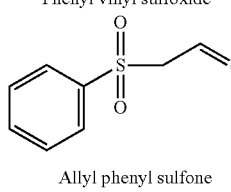
Allyl phenyl sulfone

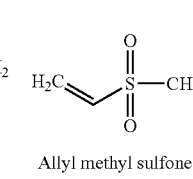
Allyl methyl sulfone

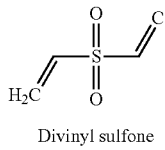
Divinyl sulfone

Simple alkyl vinyl sulfones, such as ethyl vinyl sulfone, may be polymerized via emulsion and bulk methods. Propyl vinyl sulfone may be polymerized by alkaline persulfate initiators to form soft polymers. It may be noted that aryl vinyl sulfone, e.g., naphthyl vinyl sulfone, phenyl vinyl sulfone, and parra-substituted phenyl vinyl sulfone (R=$NH_2$, $NO_2$ or Br), were reported to be unpolymerizable with free-radical initiators. However, we have observed that phenyl and methyl vinyl sulfones can be polymerized with several anionic-type initiators. Effective anionic-type catalysts or initiators are n-BuLi, ZnEt2, LiN(CH$_2$)$_2$, NaNH$_2$, and complexes of n-LiBu with ZnEt2 or AlEh. A second solvent, such as pyridine, sulfolane, toluene or benzene, can be used to dissolve alkyl vinyl sulfones, aryl vinyl sulfones, and other larger sulfone molecules.

In certain embodiments, the sulfone is selected from TrMS, MTrMS, TMS, or vinyl or double bond-containing variants of TrMS, MTrMS, TMS, EMS, MMES, EMES, EMEES, or a combination thereof; their chemical formulae being given below:

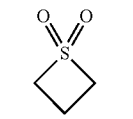
(TrMS)

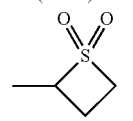
(MTrMS)

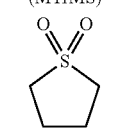
(TMS)

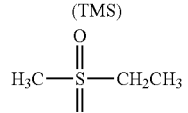
(EMS)

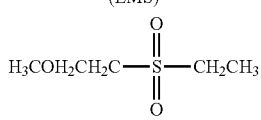
(MMES)

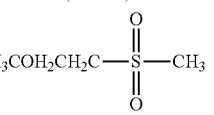
(EMES)

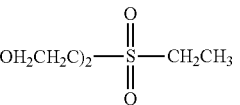
(EMEES)

The cyclic structure, such as TrMS, MTrMS, and TMS, can be polymerized via ring-opening polymerization with the assistance of an ionic type initiator.

The nitrile may be selected from AND, GLN, SEN, or a combination thereof and their chemical formulae are given below:

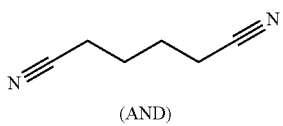
(AND)

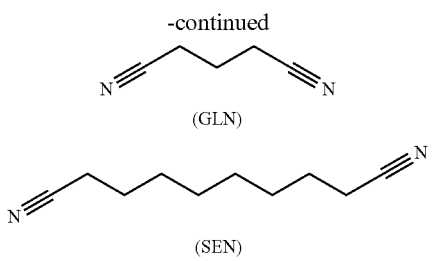
(GLN)

(SEN)

In some embodiments, the phosphate (including various derivatives of phosphoric acid), alkyl phosphonate, phosphazene, phosphite, or sulfate is selected from tris(trimethylsilyl) phosphite (TTSPi), alkyl phosphate, triallyl phosphate (TAP), ethylene sulfate (DTD), a combination thereof, or a combination with 1,3-propane sultone (PS) or propene sultone (PES). The phosphate, alkyl phosphonate, or phosphazene may be selected from the following:

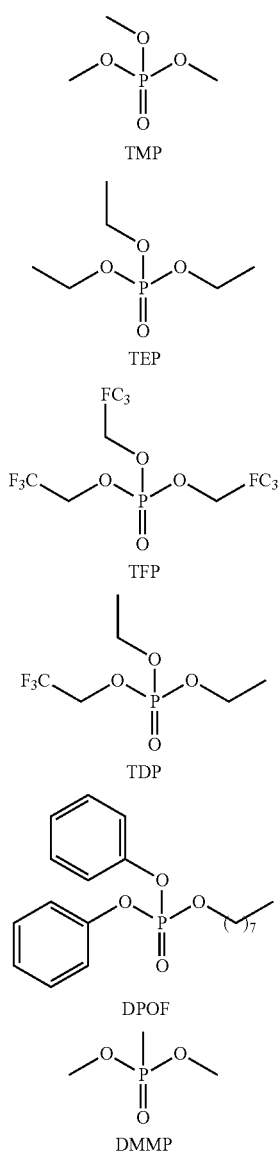

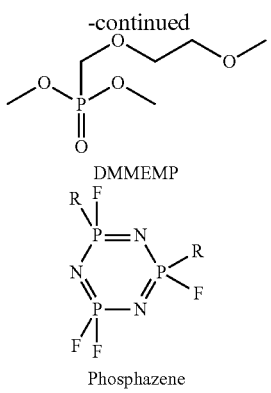

DMMEMP

Phosphazene wherein R=H, $NH_2$, or $C_1$-$C_6$ alkyl.

Phosphonate moieties can be readily introduced into vinyl monomers to produce allyl-type, vinyl-type, styrenic-type and (meth)acrylic-type monomers bearing phosphonate groups (e.g., either mono or bisphosphonate). These liquid solvents may serve as a first or a second liquid solvent in the electrolyte composition. The phosphate, alkyl phosphonate, phosphonic acid, and phosphazene, upon polymerization, are found to be essentially non-flammable. Good examples include diethyl vinylphosphonate dimethyl vinylphosphonate, vinylphosphonic acid, diethyl allyl phosphate, and diethyl allylphosphonate:

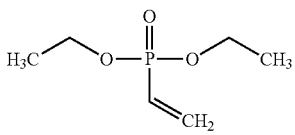
Diethyl vinylphosphonate

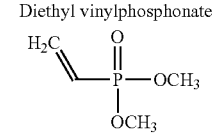
Dimethyl vinylphosphonate

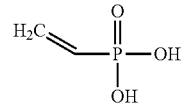
Vinylphosphonic acid

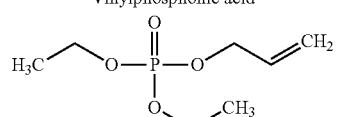
Diethyl allyl phosphate

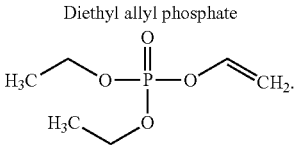
Diethyl allylphosphonate

Examples of initiator compounds that can be used in the polymerization of vinylphosphonic acid are peroxides such as benzoyl peroxide, toluyl peroxide, di-tert.butyl peroxide, chloro benzoyl peroxide, or hydroperoxides such as methylethyl ketone peroxide, tert, butyl hydroperoxide, cumene hydroperoxide, hydrogen Superoxide, or azo-bis-iso-butyro nitrile, or sulfinic acids such as p-methoxyphenyl-sulfinic acid, isoamyl-sulfinic acid, benzene-sulfinic acid, or combinations of various of such catalysts with one another and/or combinations for example, with formaldehyde sodium sulfoxylate or with alkali metal sulfites.

The siloxane or silane may be selected from alkylsiloxane (Si—O), alkyylsilane (Si—C), liquid oligomeric silaxane (—Si—O—Si—), or a combination thereof.

The reactive additive may further comprise an amide group selected from N,N-dimethylacetamide, N,N-diethylacetamide, N,N-dimethylformamide, N,N-diethylformamide, or a combination thereof.

In certain embodiments, the crosslinking agent comprises a compound having at least one reactive group selected from a hydroxyl group, an amino group, an imino group, an amide group, an acrylic amide group, an amine group, an acrylic group, an acrylic ester group, or a mercapto group in the molecule.

In certain embodiments, the crosslinking agent is selected from poly(diethanol) diacrylate, poly(ethyleneglycol)dimethacrylate, poly(diethanol) dimethylacrylate, poly(ethylene glycol) diacrylate, lithium hexafluorophosphate (LiPF$_6$), lithium borofluoride (LiBF$_4$), lithium hexafluoroarsenide (LiAsF$_6$), lithium trifluoro-metasulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium oxalyldifluoroborate (LiBF$_2$C$_2$O$_4$), or a combination thereof.

The initiator may be selected from an azo compound (e.g., azodiisobutyronitrile, AIBN), azobisisobutyronitrile, azobisisoheptonitrile, dimethyl azobisisobutyrate, benzoyl peroxide tert-butyl peroxide and methyl ethyl ketone peroxide, benzoyl peroxide (BPO), bis(4-tert-butylcyclohexyl)peroxydicarbonate, t-amyl peroxypivalate, 2,2'-azobis-(2,4-dimethylvaleronitrile), 2,2'-azobis-(2-methylbutyronitrile), 1,1-azobis(cyclohexane-1-carbonitrile), benzoylperoxide (BPO), hydrogen peroxide, dodecamoyl peroxide, isobutyryl peroxide, cumene hydroperoxide, tert-butyl peroxypivalate, diisopropyl peroxydicarbonate, or a combination thereof.

In the disclosed polymer electrolyte, the lithium salt may be selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-metasulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium oxalyldifluoroborate (LiBF$_2$C$_2$O$_4$), lithium nitrate (LiNO$_3$), Li-Fluoroalkyl-Phosphates (LiPF$_3$(CF$_2$CF$_3$)$_3$), lithium bisperfluoro-ethysulfonylimide (LiBETI), lithium bis(trifluoromethanesulphonyl)imide, lithium bis(fluorosulphonyl)imide, lithium trifluoromethanesulfonimide (LiTFSI), an ionic liquid lithium salt, or a combination thereof.

The crosslinking agent preferably comprises a compound having at least one reactive group selected from a hydroxyl group, an amino group, an imino group, an amide group, an amine group, an acrylic group, or a mercapto group in the molecule. The amine group is preferably selected from Chemical Formula 2:

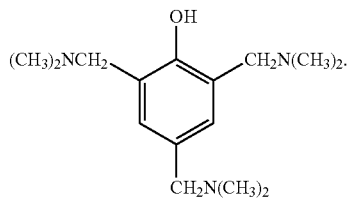

(Chemical Formula 2)

In the rechargeable lithium battery, the reactive additive may further comprise a chemical species represented by Chemical Formula 3 or a derivative thereof and the crosslinking agent comprises a chemical species represented by Chemical Formula 4 or a derivative thereof:

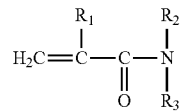

(Chemical Formula 3)

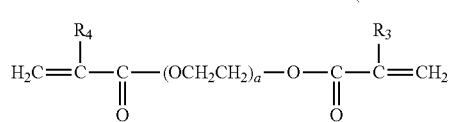

(Chemical Formula 4)

where $R_1$ is hydrogen or methyl group, and $R_2$ and $R_3$ are each independently one selected from the group consisting of hydrogen, methyl, ethyl, propyl, diallylaminopropyl (—C$_3$H$_6$N(R')$_2$) and hydroxyethyl (CH$_2$CH$_2$OH) groups, and $R_4$ and $R_5$ are each independently hydrogen or methyl group, and n is an integer from 3 to 30, wherein R' is C$_1$-C$_5$ alkyl group.

Examples of suitable vinyl monomers having Chemical formula 3 include acrylamide, N,N-dimethylacrylamide, N,N-diethylacrylamide, N-isopropylacrylamide, N,N-dimethylamino-propylacrylamide, and N-acryloylmorpholine. Among these species, N-isopropylacrylamide and N-acryloylmorpholine are preferred.

The crosslinking agent is preferably selected from N,N-methylene bisacrylamide, epichlorohydrin, 1,4-butanediol diglycidyl ether, tetrabutylammonium hydroxide, cinnamic acid, ferric chloride, aluminum sulfate octadecahydrate, diepoxy, dicarboxylic acid compound, poly(potassium 1-hydroxy acrylate) (PKHA), glycerol diglycidyl ether (GDE), ethylene glycol, polyethylene glycol, polyethylene glycol diglycidyl ether (PEGDE), citric acid (Formula 4 below), acrylic acid, methacrylic acid, a derivative compound of acrylic acid, a derivative compound of methacrylic acid (e.g. polyhydroxyethylmethacrylate), glycidyl functions, N,N'-Methylenebisacrylamide (MBAAm), Ethylene glycol dimethacrylate (EGDMAAm), isobornyl methacrylate, poly(acrylic acid) (PAA), methyl methacrylate, isobornyl acrylate, ethyl methacrylate, isobutyl methacrylate, n-Butyl methacrylate, ethyl acrylate, 2-Ethyl hexyl acrylate, n-Butyl acrylate, a diisocyanate (e.g. methylene diphenyl diisocyanate, MDI), an urethane chain, a chemical derivative thereof, or a combination thereof.

The polymer in the electrolyte may form a mixture, copolymer, semi-interpenetrating network, or simultaneous interpenetrating network with a second polymer selected from poly(ethylene oxide), polypropylene oxide, poly(ethylene glycol), poly(acrylonitrile), poly(methyl methacrylate), poly(vinylidene fluoride), poly bis-methoxy ethoxyethoxide-phosphazenex, polyvinyl chloride, polydimethylsiloxane, poly(vinylidene fluoride)-hexafluoropropylene, cyanoethyl poly(vinyl alcohol), a pentaerythritol tetraacrylate-based polymer, an aliphatic polycarbonate, a single Li-ion conducting solid polymer electrolyte with a carboxylate anion, a sulfonylimide anion, or sulfonate anion, a crosslinked electrolyte of poly(ethylene glycol) diacrylate or poly(ethylene glycol) methyl ether acrylate, a sulfonated derivative thereof, or a combination thereof. One or more of these polymers may be pre-mixed into the anode and/or the cathode prior to assembling the electrodes and other components into a dry cell.

These solid electrolyte particles dispersed in an electrolyte polymer can help enhance the lithium ion conductivity of certain polymers having an intrinsically low ion conductivity. Preferably and typically, the polymer has a lithium ion conductivity no less than $10^{-5}$ S/cm, more preferably no less than $10^{-4}$ S/cm, and further preferably no less than $10^{-3}$ S/cm.

The disclosed lithium battery can be a lithium-ion battery or a lithium metal battery, the latter having lithium metal as the primary anode active material. The lithium metal battery can have lithium metal implemented at the anode when the cell is made. Alternatively, the lithium may be stored in the cathode active material and the anode side is lithium metal-free initially. This is called an anode-less lithium metal battery.

As illustrated in FIG. 2(A), the anode-less lithium cell is in an as-manufactured or fully discharged state according to certain embodiments of the present disclosure. The cell comprises an anode current collector 12 (e.g., Cu foil), a separator, a cathode layer 16 comprising a cathode active material, an optional conductive additive (not shown), an optional resin binder (not shown), and an electrolyte (dispersed in the entire cathode layer and in contact with the cathode active material), and a cathode current collector 18 that supports the cathode layer 16. There is no lithium metal in the anode side when the cell is manufactured.

In a charged state, as illustrated in FIG. 2(B), the cell comprises an anode current collector 12, lithium metal 20 plated on a surface (or two surfaces) of the anode current collector 12 (e.g., Cu foil), a separator 15, a cathode layer 16, and a cathode current collector 18 supporting the cathode layer. The lithium metal comes from the cathode active material (e.g., $LiCoO_2$ and $LiMn_2O_4$) that contains Li element when the cathode is made. During a charging step, lithium ions are released from the cathode active material and move to the anode side to deposit onto a surface or both surfaces of an anode current collector.

One unique feature of the presently disclosed anode-less lithium cell is the notion that there is substantially no anode active material and no lithium metal is present when the battery cell is made. The commonly used anode active material, such as an intercalation type anode material (e.g., graphite, carbon particles, Si, SiO, Sn, $SnO_2$, Ge, etc.), P, or any conversion-type anode material, is not included in the cell. The anode only contains a current collector or a protected current collector. No lithium metal (e.g., Li particle, surface-stabilized Li particle, Li foil, Li chip, etc.) is present in the anode when the cell is made; lithium is basically stored in the cathode (e.g., Li element in $LiCoO_2$, $LiMn_2O_4$, lithium iron phosphate, lithium polysulfides, lithium polyselenides, etc.). During the first charge procedure after the cell is sealed in a housing (e.g., a stainless steel hollow cylinder or an Al/plastic laminated envelop), lithium ions are released from these Li-containing compounds (cathode active materials) in the cathode, travel through the electrolyte/separator into the anode side, and get deposited on the surfaces of an anode current collector. During a subsequent discharge procedure, lithium ions leave these surfaces and travel back to the cathode, intercalating or inserting into the cathode active material.

Such an anode-less cell is much simpler and more cost-effective to produce since there is no need to have a layer of anode active material (e.g., graphite particles, along with a conductive additive and a binder) pre-coated on the Cu foil surfaces via the conventional slurry coating and drying procedures. The anode materials and anode active layer manufacturing costs can be saved. Furthermore, since there is no anode active material layer (otherwise typically 40-200 μm thick), the weight and volume of the cell can be significantly reduced, thereby increasing the gravimetric and volumetric energy density of the cell.

Another important advantage of the anode-less cell is the notion that there is no lithium metal in the anode when a lithium metal cell is made. Lithium metal (e.g., Li metal foil and particles) is highly sensitive to air moisture and oxygen and notoriously known for its difficulty and danger to handle during manufacturing of a Li metal cell. The manufacturing facilities must be equipped with special class of dry rooms, which are expensive and significantly increase the battery cell costs.

The anode current collector may be selected from a foil, perforated sheet, or foam of Cu, Ni, stainless steel, Al, graphene, graphite, graphene-coated metal, graphite-coated metal, carbon-coated metal, or a combination thereof. Preferably, the current collector is a Cu foil, Ni foil, stainless steel foil, graphene-coated Al foil, graphite-coated Al foil, or carbon-coated Al foil.

The anode current collector typically has two primary surfaces. Preferably, one or both of these primary surfaces is deposited with multiple particles or coating of a lithium-attracting metal (lithiophilic metal), wherein the lithium-attracting metal, preferably having a diameter or thickness from 1 nm to 10 μm, is selected from Au, Ag, Mg, Zn, Ti, K, Al, Fe, Mn, Co, Ni, Sn, V, Cr, an alloy thereof, or a combination thereof. This deposited metal layer may be further deposited with a layer of graphene that covers and protects the multiple particles or coating of the lithiophilic metal.

The graphene layer may comprise graphene sheets selected from single-layer or few-layer graphene, wherein the few-layer graphene sheets are commonly defined to have 2-10 layers of stacked graphene planes having an inter-plane spacing $d_{002}$ from 0.3354 nm to 0.6 nm as measured by X-ray diffraction. The single-layer or few-layer graphene sheets may contain a pristine graphene material having essentially zero % of non-carbon elements, or a non-pristine graphene material having 0.001% to 45% by weight of non-carbon elements. The non-pristine graphene may be selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

The graphene layer may comprise graphene balls and/or graphene foam. Preferably, the graphene layer has a thickness from 1 nm to 50 μm and/or has a specific surface area from 5 to 1000 $m^2/g$ (more preferably from 10 to 500 $m^2/g$).

For a lithium-ion battery featuring the presently disclosed electrolyte, there is no particular restriction on the selection of an anode active material. The anode active material may be selected from the group consisting of: (a) silicon (Si), germanium (Ge), tin (Sn), lead (Pb), antimony (Sb), phosphorus (P), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium titanium niobate, lithium-containing titanium oxide, lithium transition metal oxide, $ZnCo_2O_4$; (f) carbon or graphite particles (g) prelithiated versions thereof; and (h) combinations thereof.

Another surprising and of tremendous scientific and technological significance is our discovery that the flammability of any volatile organic solvent can be effectively suppressed provided that a sufficiently high amount of a lithium salt is added and dissolved in this organic solvent and/or a sufficient amount of liquid solvent is polymerized to form a solid-like or quasi-solid electrolyte (e.g., first electrolyte in the cathode). In general, such a quasi-solid electrolyte exhibits a vapor pressure less than 0.01 kPa and often less than 0.001 kPa (when measured at 20° C.) and less than 0.1 kPa and often less than 0.01 kPa (when measured at 100° C.). (The vapor pressures of the corresponding neat solvent, without any lithium salt dissolved therein, are typically significantly higher.) In many cases, the vapor molecules are practically too few to be detected.

A highly significant observation is that the polymer derived (polymerized) from an otherwise volatile solvent (monomer) can dramatically curtail the amount of volatile solvent molecules that can escape into the vapor phase in a thermodynamic equilibrium condition. In many cases, this has effectively prevented any flammable gas molecules from initiating a flame even at an extremely high temperature. The flash point of the quasi-solid or solid-state electrolyte is typically at least 100 degrees (often >150 degrees) higher than the flash point of the neat organic solvent without polymerization. In most of the cases, either the flash point is significantly higher than 200° C. or no flash point can be detected. The electrolyte just would not catch on fire. Furthermore, any accidentally initiated flame does not sustain for longer than 3 seconds. This is a highly significant discovery, considering the notion that fire and explosion concern has been a major impediment to widespread acceptance of battery-powered electric vehicles. This new technology could significantly impact the emergence of a vibrant EV industry.

In addition to the non-flammability and high lithium ion transference numbers, there are several additional benefits associated with using the presently disclosed quasi-solid or solid-state electrolytes. As one example, these electrolytes can significantly enhance cycling and safety performance of rechargeable lithium batteries through effective suppression of lithium dendrite growth. Due to a good contact between the electrolyte and an electrode, the interfacial impedance can be significantly reduced. Additionally, the local high viscosity induced by presence of a polymer in the anode can increase the pressure from the electrolyte to inhibit dendrite growth, potentially resulting in a more uniform deposition of lithium ions on the surface of the anode. The high viscosity could also limit anion convection near the deposition area, promoting more uniform deposition of Li ions. These reasons, separately or in combination, are believed to be responsible for the notion that no dendrite-like feature has been observed with any of the large number of rechargeable lithium cells that we have investigated thus far.

As another benefit example, this electrolyte is capable of inhibiting lithium polysulfide dissolution at the cathode and migration to the anode of a Li—S cell, thus overcoming the polysulfide shuttle phenomenon and allowing the cell capacity not to decay significantly with time. Consequently, a coulombic efficiency nearing 100% along with long cycle life can be achieved. When a concentrated electrolyte or crosslinked polymer is used, the solubility of lithium polysulfide will be reduced significantly.

The lithium salt may be selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis (oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-Fluoroalkyl-Phosphates ($LiPF_3(CF_2CF_3)_3$), lithium bisperfluoro-ethysulfonylimide (LiBETI), lithium bis(trifluoromethanesulphonyl)imide, lithium bis(fluorosulphonyl)imide, lithium trifluoromethanesulfonimide (LiTFSI), an ionic liquid lithium salt, or a combination thereof.

There is also no restriction on the type of the cathode materials that can be used in practicing the present disclosure. For Li—S cells, the cathode active material may contain lithium polysulfide or sulfur. If the cathode active material includes lithium-containing species (e.g., lithium polysulfide) when the cell is made, there is no need to have a lithium metal pre-implemented in the anode.

There are no particular restrictions on the types of cathode active materials that can be used in the presently disclosed lithium battery, which can be a primary battery or a secondary battery. The rechargeable lithium metal or lithium-ion cell may preferably contain a cathode active material selected from, as examples, a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

In a rechargeable lithium cell, the cathode active material may be selected from a metal oxide, a metal oxide-free inorganic material, an organic material, a polymeric material, sulfur, lithium polysulfide, selenium, or a combination thereof. The metal oxide-free inorganic material may be selected from a transition metal fluoride, a transition metal chloride, a transition metal dichalcogenide, a transition metal trichalcogenide, or a combination thereof. In a particularly useful embodiment, the cathode active material is selected from $FeF_3$, $FeCl_3$, $CuCl_2$, $TiS_2$, $TaS_2$, $MoS_2$, $NbSe_3$, $MnO_2$, $CoO_2$, an iron oxide, a vanadium oxide, or a combination thereof, if the anode contains lithium metal as the anode active material. The vanadium oxide may be preferably selected from the group consisting of $VO_2$, $Li_xVO_2$, $V_2O_5$, $Li_xV_2O_5$, $V_3O_8$, $Li_xV_3O_5$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1 < x < 5$. For those cathode active materials containing no Li element therein, there must be a lithium source implemented in the cathode side to begin with. This can be any compound that contains a high lithium content, or a lithium metal alloy, etc.

In a rechargeable lithium cell (e.g., the lithium-ion battery cell), the cathode active material may be selected to contain a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

Particularly desirable cathode active materials comprise lithium nickel manganese oxide (LiNi$_a$Mn$_{2-a}$O$_4$, 0<a<2), lithium nickel manganese cobalt oxide (LiNi$_n$Mn$_m$Co$_{1-n-m}$O$_2$, 0<n<1, 0<m<1, n+m<1), lithium nickel cobalt aluminum oxide (LiNi$_c$Co Al$_{1-c-d}$O$_2$, 0<c<1, 0<d<1, c+d<1), lithium manganate (LiMn$_2$O$_4$), lithium iron phosphate (LiFePO$_4$), lithium manganese oxide (LiMnO$_2$), lithium cobalt oxide (LiCoO$_2$), lithium nickel cobalt oxide (LiNi$_p$Co$_{1-p}$O$_2$, 0<p<1), or lithium nickel manganese oxide (LiNi$_q$Mn$_{2-q}$O$_4$, 0<q<2).

In a preferred lithium metal secondary cell, the cathode active material preferably contains an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof. Again, for those cathode active materials containing no Li element therein, there must be a lithium source implemented in the cathode side to begin with.

In another preferred rechargeable lithium cell (e.g. a lithium metal secondary cell or a lithium-ion cell), the cathode active material contains an organic material or polymeric material selected from Poly(anthraquinonyl sulfide) (PAQS), lithium oxocarbons (including squarate, croconate, and rhodizonate lithium salts), oxacarbon (including quinines, acid anhydride, and nitrocompound), 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material (redox-active structures based on multiple adjacent carbonyl groups (e.g., "C$_6$O$_6$"-type structure, oxocarbons), Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([(NPS$_2$)$_3$]n), lithiated 1,4,5,8-naphthalenetetraol formaldehyde polymer, Hexaazatrinaphtylene (HATN), Hexaazatriphenylene hexacarbonitrile (HAT(CN) 6), 5-Benzylidene hydantoin, Isatine lithium salt, Pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, Li$_4$C$_6$O$_6$, Li$_2$C$_6$O$_6$, Li$_6$C$_6$O$_6$, or a combination thereof.

The thioether polymer may be selected from Poly[methanetetryl-tetra(thiomethylene)](PMTTM), Poly(2,4-dithiopentanylene) (PDTP), or Poly(ethene-1,1,2,2-tetrathiol) (PETT) as a main-chain thioether polymer, in which sulfur atoms link carbon atoms to form a polymeric backbones. The side-chain thioether polymers have polymeric main-chains that consist of conjugating aromatic moieties, but having thioether side chains as pendants. Among them Poly(2-phenyl-1,3-dithiolane) (PPDT), Poly(1,4-di(1,3-dithiolan-2-yl)benzene) (PDDTB), poly(tetrahydrobenzodithiophene) (PTHBDT), and poly[1,2,4,5-tetrakis(propylthio)benzene](PTKPTB) have a polyphenylene main chain, linking thiolane on benzene moieties as pendants. Similarly, poly[3,4(ethylenedithio)thiophene] (PEDTT) has polythiophene backbone, linking cyclo-thiolane on the 3,4-position of the thiophene ring.

In yet another preferred rechargeable lithium cell, the cathode active material contains a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof. This class of lithium secondary batteries has a high capacity and high energy density. Again, for those cathode active materials containing no Li element therein, there must be a lithium source implemented in the cathode side to begin with.

Figure 1B:
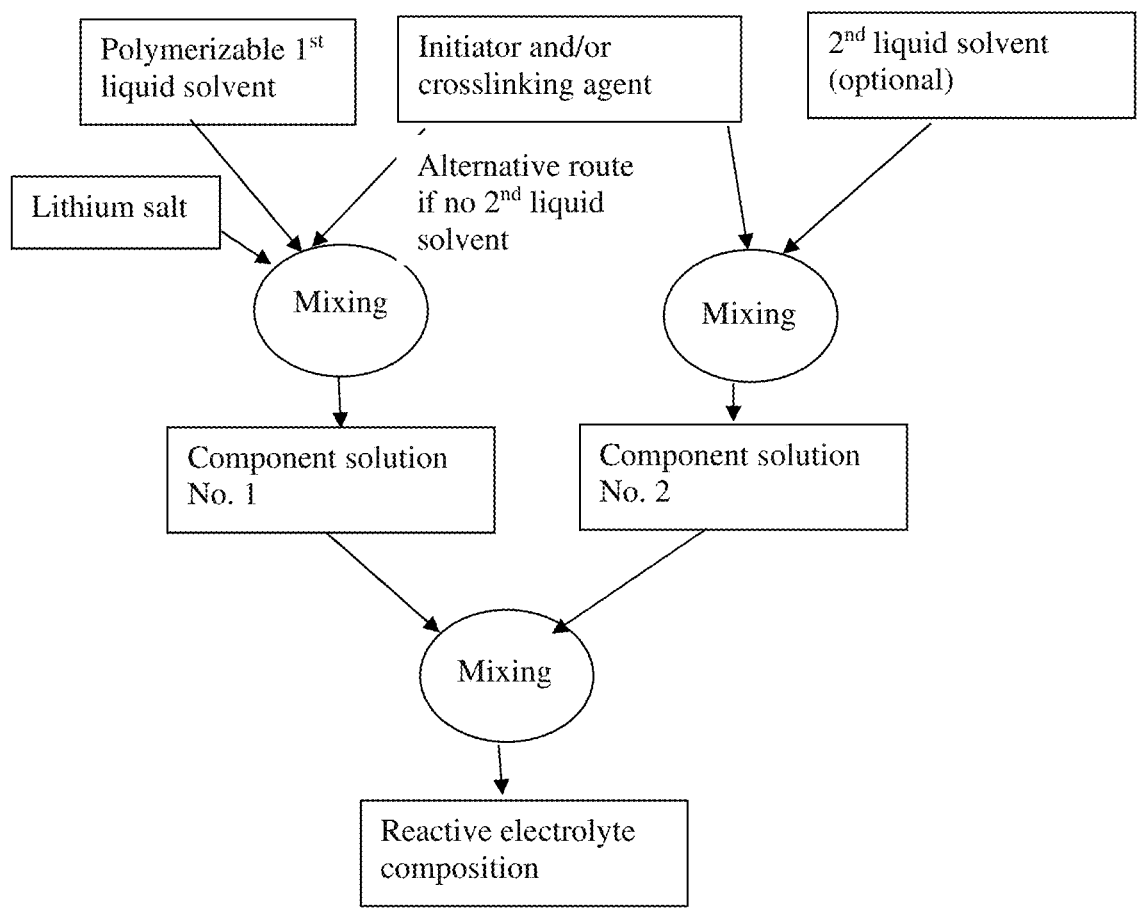
FIG. 1(B) A process flow chart to illustrate the method of producing a reactive electrolyte composition according to some embodiments of the present disclosure.

As illustrated in FIG. 1(B), the present disclosure also provides an electrolyte composition comprising: (a) a first solution, comprising at least a polymerizable first liquid solvent; and (b) a second solution, comprising an initiator and/or crosslinking agent, a lithium salt, and a second non-aqueous liquid solvent (e.g., an organic solvent or ionic liquid solvent); wherein the first solution and the second solution are stored separately before the first solution and the second solution are mixed to form the electrolyte. The first liquid solvent has a lower flash point (higher flammability), a higher vapor pressure, a higher dielectric constant, or a higher solubility of the lithium salt as compared with the second liquid solvent. Actually, the lithium salt may be dissolved in the first solvent, the second solvent, or both. Alternatively, the initiator and/or crosslinking agent may be directly added into the first liquid solvent if no second liquid solvent is used.

The disclosure further provides a method of producing a rechargeable lithium cell (as illustrated in FIG. 1(A)), the method comprising: (a) providing a cathode; (b) providing an anode; (c) combining the cathode and the anode to form a dry cell; and (d) introducing (e.g., injecting) the presently disclosed electrolyte composition into the dry cell and polymerizing and/or crosslinking the reactive additive to produce the substantially solid-state rechargeable lithium cell. Step (d) may comprise partially or totally removing any un-polymerized liquid solvent, if so desired.

In this method, step (a) may be selected from any commonly used cathode production process. For instance, the process may include (i) mixing particles of a cathode active material, a conductive additive, an optional resin binder, powder particles of a solid inorganic electrolyte, and an optional flame retardant in a liquid medium (e.g., an organic solvent, such as NMP) to form a slurry; and (ii) coating the slurry on a cathode current collector (e.g., an Al foil) and removing the solvent. The anode in step (b) may be produced in a similar manner, but using particles of an anode active material (e.g., particles of Si, SiO, Sn, SnO$_2$, graphite, and carbon). The liquid medium used in the production of an anode may be water or an organic solvent. Step (c) may entail combining the anode, a porous separator, the cathode, along with their respective current collectors, to form a unit cell which is enclosed in a protective housing to form a dry cell.

Figure 1C:
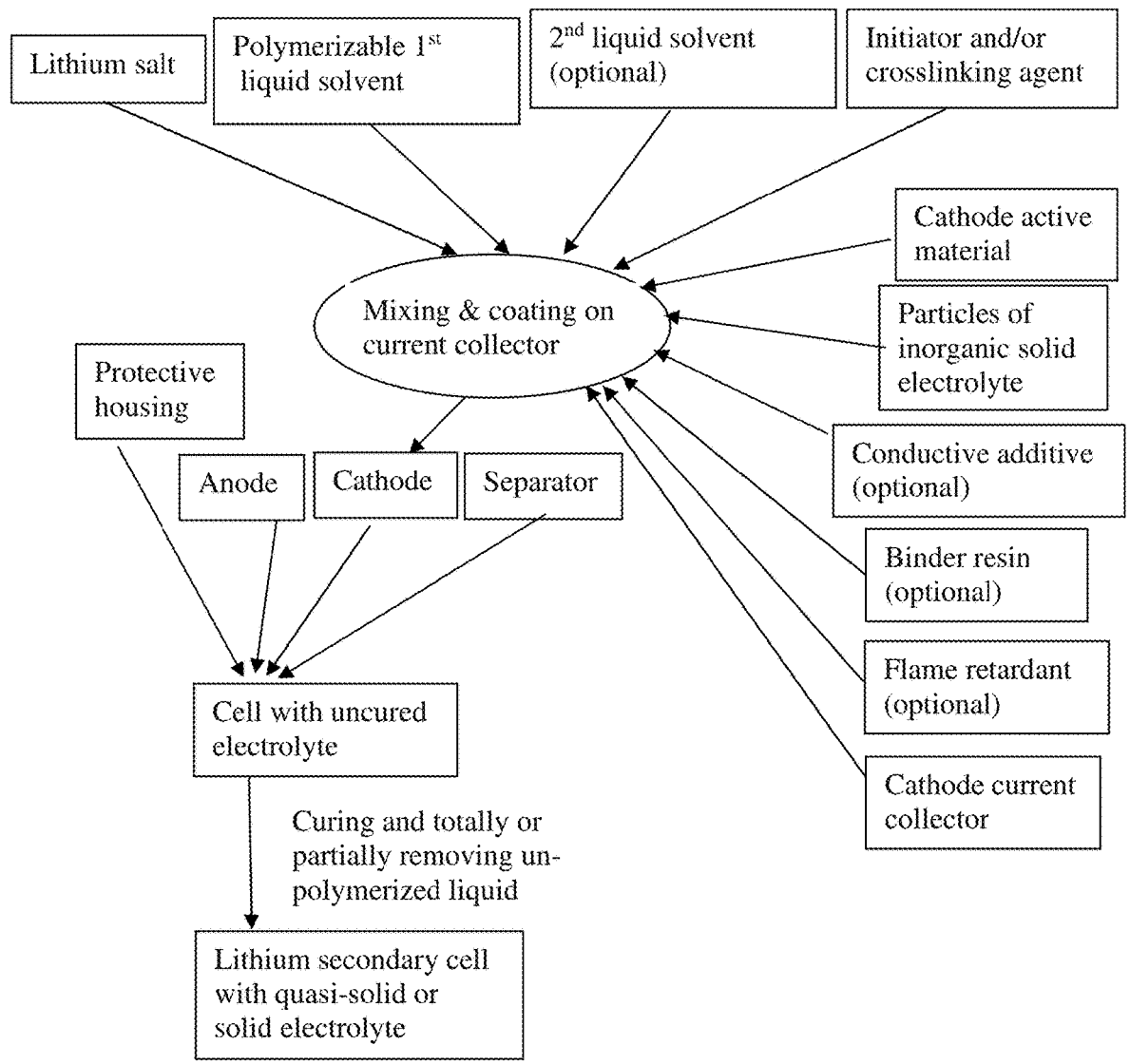
FIG. 1(C) A process flow chart to illustrate a method of producing a lithium metal battery comprising a substantially solid-state electrolyte according to some embodiments of the present disclosure.

As illustrated in FIG. 1(C), the disclosure also provides a method of producing the disclosed rechargeable lithium cell, the method comprising: (A) mixing particles of a cathode active material, powder particles of an inorganic solid electrolyte, an optional conductive additive (typically required in the cathode), an optional binder (optional but not required since, upon polymerization and/or crosslinking, the reactive additive becomes a binder that bonds the solid particles in the electrode together), an optional flame retardant, a reactive additive, and a lithium salt to form a cathode, wherein the reactive additive comprises at least one polymerizable or crosslinkable solvent and a curing agent or initiator; (B) providing an anode; (C) combining the cathode and the anode to form a cell; and (D) polymerizing and/or crosslinking the reactive additive, prior to or after step (C), to produce the rechargeable lithium cell.

In step (A), particles of a cathode active material, an optional conductive additive, an optional binder, an optional flame retardant, a lithium salt, and particles of an inorganic solid electrolyte powder may be dissolved or dispersed in a reactive additive (containing at least a polymerizable liquid solvent) to form a slurry. The slurry is attached to or coated on a primary surface or both primary surfaces of a cathode current collector (e.g., Al foil) to form a cathode.

In certain embodiments, step (B) comprises a procedure of mixing particles of an anode active material, powder particles of an inorganic solid electrolyte, an optional conductive additive (not required if the anode active material is a carbon or graphite material), an optional binder (not required since, upon polymerization and/or crosslinking, the reactive additive becomes a binder that bonds the solid particles in the electrode together), an optional flame retardant, a reactive additive (the same or different reactive as used in the cathode), and a lithium salt to form an anode.

The method further comprises polymerizing and/or crosslinking the reactive additive, prior to or after step (C), to produce the rechargeable lithium cell.

In some desired embodiments, step (A) comprises adding particles of an inorganic solid electrolyte powder in the cathode and step (B) comprises adding particles of an inorganic solid electrolyte powder in the anode.

Figure 1D:
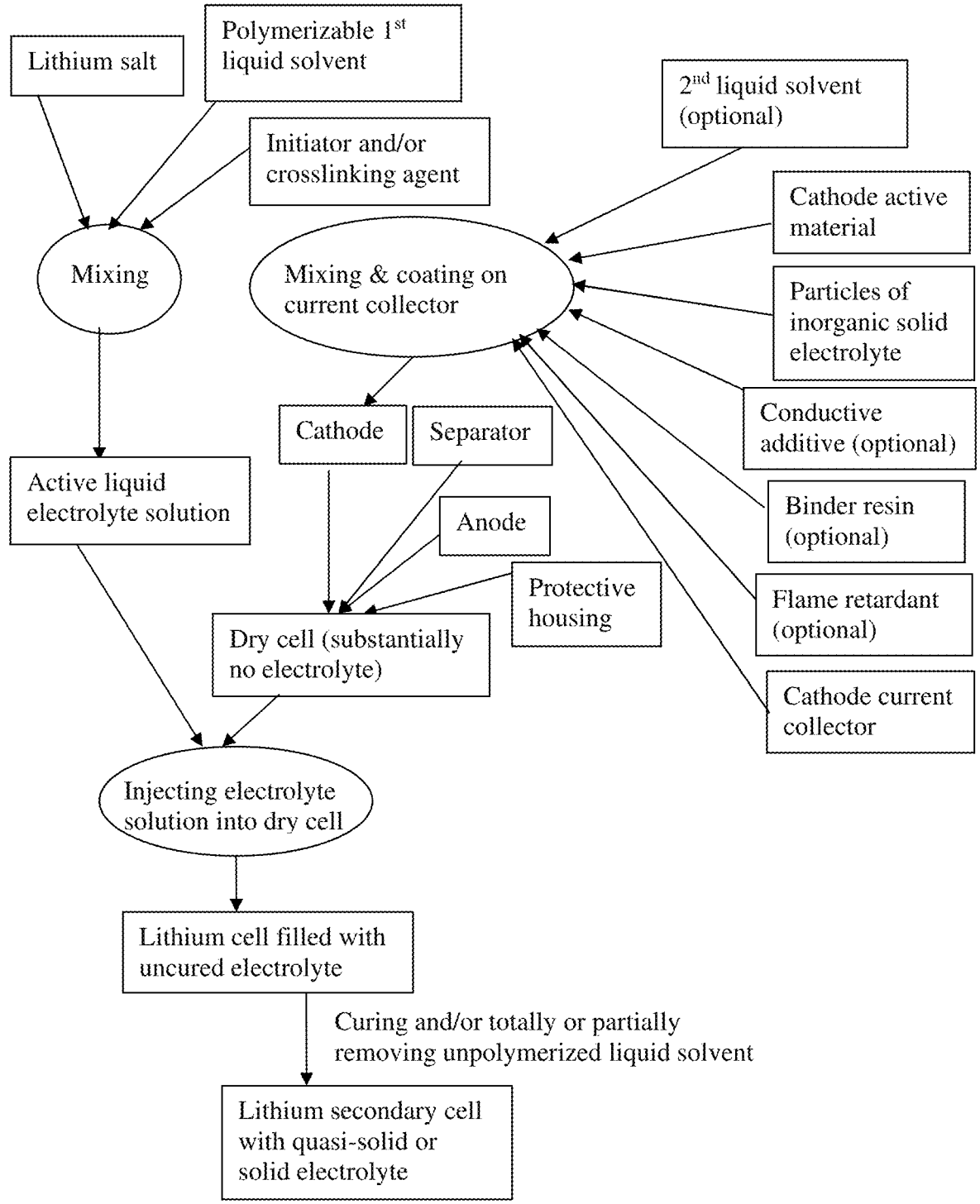
FIG. 1(D) A process flow chart to illustrate a method of producing a lithium metal battery comprising a substantially solid-state electrolyte according to some embodiments of the present disclosure.

Illustrated in FIG. 1(D) is yet another embodiment of the present disclosure, which is a method of producing the disclosed rechargeable lithium cell. The method comprises: (A) mixing particles of a cathode active material, an optional conductive additive (typically required in the cathode), an optional binder (not required since the reactive additive becomes a binder upon polymerization and/or crosslinking), an optional flame retardant, powder particles of an inorganic solid electrolyte, and a reactive additive to form a cathode (preferably containing at least one cathode active material layer supported on a current collector), wherein the reactive additive comprises at least one polymerizable liquid solvent; (B) providing an anode; (C) combining the cathode, an optional separator, the anode, and a protective housing to form a cell; and (D) injecting a liquid mixture of a lithium salt, an initiator or crosslinking agent, an optional flame retardant (if in a liquid state) and a second non-aqueous liquid solvent into the cell and polymerizing and/or crosslinking the reactive additive to produce the rechargeable lithium cell. This may be followed by a step of partially or totally removing any un-polymerized solvent.

For the production of a lithium-ion cell, step (B) may comprise mixing particles of an anode material (e.g., Si, SiO, graphite, carbon particles, etc.), an optional conductive additive, an optional binder, an optional flame retardant, particles of an inorganic solid electrolyte powder, and a reactive additive to form at least one anode active layer supported on an anode current collector (e.g., Cu foil).

The following examples are presented primarily for the purpose of illustrating the best mode practice of the present disclosure, not to be construed as limiting the scope of the present disclosure.

It may be noted that the more desirable and typical lithium ion conductivity of the polymer (without or with some amount of liquid solvent) herein studied is from $10^{-6}$ S/cm to $5 \times 10^{-2}$ S/cm and that of the inorganic solid electrolyte (ISE) is from $10^{-6}$ S/cm to $2 \times 10^{-2}$ S/cm. The ISE-to-polymer electrolyte volume ratio can be from 1/99 to 99/1, but typically from 5/95 to 95/5, more typically from 10/90 to 90/10, further more typically from 20/80 to 80/20, and most typically from 30/70 to 70/30. The goal is to achieve a lithium ion conductivity of the resulting hybrid electrolyte from $10^{-5}$ S/cm to $5 \times 10^{-2}$ S/cm, preferably greater than $10^{-4}$ S/cm, and more preferably greater than $10^{-3}$ S/cm.

Example 1: Preparation of Inorganic Solid Electrolyte (ISE) Powder, Lithium Nitride Phosphate Compound (LIPON)

Particles of $Li_3PO_4$ (average particle size 4 μm) and urea were prepared as raw materials; 5 g each of $Li_3PO_4$ and urea was weighed and mixed in a mortar to obtain a raw material composition. Subsequently, the raw material composition was molded into 1 cm×1 cm×10 cm rod with a molding machine, and the obtained rod was put into a glass tube and evacuated. The glass tube was then subjected to heating at 500° C. for 3 hours in a tubular furnace to obtain a lithium nitride phosphate compound (LIPON). The compound was ground in a mortar into a powder form. These ISE particles can be combined with an in situ cured polymer to form a hybrid solid-state or quasi-solid electrolyte in an anode, a cathode, and/or a separator.

Example 2: Preparation of Solid Electrolyte Powder, Lithium Superionic Conductors with the $Li_{10}GeP_2S_{12}$ (LGPS)-Type Structure The starting materials, $Li_2S$ and $SiO_2$ powders, were milled to obtain fine particles using a ball-milling apparatus. These starting materials were then mixed together with $P_2S_5$ in the appropriate molar ratios in an Ar-filled glove box. The mixture was then placed in a stainless steel pot, and milled for 90 min using a high-intensity ball mill. The specimens were then pressed into pellets, placed into a graphite crucible, and then sealed at 10 Pa in a carbon-coated quartz tube. After being heated at a reaction temperature of 1,000° C. for 5 h, the tube was quenched into ice water. The resulting inorganic solid electrolyte material was then subjected to grinding in a mortar to form a powder sample to be later added as inorganic solid electrolyte particles dispersed in an intended polymer electrolyte matrix.

Example 3: Preparation of Garnet-Type Inorganic Solid Electrolyte Powder

The synthesis of the $c\text{-}Li_{6.25}Al_{0.25}La_3Zr_2O_{12}$ was based on a modified sol-gel synthesis-combustion method, resulting in sub-micron-sized particles after calcination at a temperature of 650° C. (J. van den Broek, S. Afyon and J. L. M. Rupp, Adv. Energy Mater., 2016, 6, 1600736).

For the synthesis of cubic garnet particles of the composition $c\text{-}Li_{6.25}Al_{0.25}La_3Zr_2O_{12}$, stoichiometric amounts of $LiNO_3$, $Al(NO_3)_3\text{-}9H_2O$, $La(NO_3)_3\text{-}6(H_2O)$, and zirconium (IV) acetylacetonate were dissolved in a water/ethanol mixture at temperatures of 70° C. To avoid possible Li-loss during calcination and sintering, the lithium precursor was taken in a slight excess of 10 wt % relative to the other precursors. The solvent was left to evaporate overnight at 95° C. to obtain a dry xerogel, which was ground in a mortar and calcined in a vertical tube furnace at 650° C. for 15 h in alumina crucibles under a constant synthetic airflow. Calcination directly yielded the cubic phase c-Li$_{6.25}$Al$_{0.25}$La$_3$Zr$_2$O$_{12}$, which was ground to a fine powder in a mortar for further processing.

The c-Li$_{6.25}$Al$_{0.25}$La$_3$Zr$_2$O$_{12}$ solid electrolyte pellets with relative densities of ~87±3% made from this powder (sintered in a horizontal tube furnace at 1070° C. for 10 h under O$_2$ atmosphere) exhibited an ionic conductivity of ~0.5× 10$^{-3}$ S cm$^{-1}$ (RT). The garnet-type solid electrolyte with a composition of c-Li$_{6.25}$Al$_{0.25}$La$_3$Zr$_2$O$_{12}$ (LLZO) in a powder form was dispersed in several in situ cured ion-conducting polymers.

Example 4: Preparation of Sodium Superionic Conductor (NASICON) Type Inorganic Solid Electrolyte Powder The Na$_{3.1}$Zr$_{1.95}$M$_{0.05}$Si$_2$PO$_{12}$ (M=Mg, Ca, Sr, Ba) materials were synthesized by doping with alkaline earth ions at octahedral 6-coordination Zr sites. The procedure employed consists of two sequential steps. Firstly, solid solutions of alkaline earth metal oxides (MO) and ZrO$_2$ were synthesized by high energy ball milling at 875 rpm for 2 h. Then NASICON Na$_{3.1}$Zr$_{1.95}$M$_{0.05}$Si$_2$PO$_{12}$ structures were synthesized through solid-state reaction of Na$_2$CO$_3$, Zr$_{1.95}$M$_{0.05}$O$_{3.95}$, SiO$_2$, and NH$_4$H$_2$PO$_4$ at 1260° C.

Example 5: Lithium Metal Cell Containing an In Situ Polymerized VC or FEC as the First Liquid Solvent and TEP as a Second Liquid Solvent In one example, vinylene carbonate (VC) or fluoroethylene carbonate (FEC) as a first liquid solvent, TEP as a second liquid solvent (flame retardant), and poly(ethylene glycol) diacrylate (PEGDA, as a crosslinking agent) were stirred under the protection of argon gas until a homogeneous solution was obtained. The TEP has the following chemical structure:

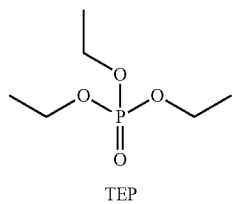

TEP

Subsequently, lithium hexafluoro phosphate, as a lithium salt, was added and dissolved in the above solution to obtain a reactive mixture solution, wherein the weight fractions of VC or FEC, TEP, polyethylene glycol diacrylate, and lithium hexafluoro phosphate were 80 wt %, 5 w %, 10 wt %, and 5 wt %, respectively.

A lithium metal cell was made, comprising a lithium metal foil as the anode active material, a cathode (comprising 85% by weight of LiCoO$_2$ as the cathode active material, 7% of Li$_7$La$_3$Zr$_2$O$_{12}$ particles, 5% PVDF binder, and 3% combined graphene/CNT as a conductive additive), and a solid-state electrolyte-based separator composed of particles of Li$_7$La$_3$Zr$_2$O$_{12}$ embedded in a poly(vinylidene fluoride)-hexafluoropropylene (PVDF-HFP) matrix (inorganic solid electrolyte/PVDF-HFP ratio=4/6). This cell was then injected with the reactive solution mixture (10% by weight based on the total cell weight). The cell was then irradiated with electron beam at room temperature until a total dosage of 40 Gy was reached. In-situ polymerization of the polymerizable first liquid solvent in the battery cell was accomplished, resulting in a quasi-solid electrolyte that permeates into the cathode to wet the surfaces of LiCoO$_2$ particles, impregnates the porous separator, and comes in contact with the lithium metal in the anode.

Example 6: 1,3-Dioxolane (DOL) as the Polymerizable First Solvent and an Unsaturated Phosphazene, Alone or in Combination with EC, as a Second Solvent In this study, all of the electrolytes were prepared in an Ar-filled glovebox. The polymerizable liquid electrolyte composition comprises anhydrous DOL (99.8%, containing approximately 75 ppm butylated hydroxytoluene (BHT) as inhibitor; Sigma-Aldrich). A total of 0.6 M LiTFSI (TCI America) and 0.4 M LiDFOB (Sigma-Aldrich) were added to the above solvent to prepare the electrolytes. One electrolyte was prepared by dissolving the salts in pure DOL. In several electrolytes, a ternary salt composition (0.6 M LiTFSI+0.2 M LiDFOB and 0.2 M LiBOB [Sigma-Aldrich]) was used to prepare the electrolytes using the same process. Aluminum triflate (Al(OTf)3, 99%; Alfa Aesar) with a concentration of 2 mM was also added to accelerate the polymerization reaction. Electrolyte compositions used in the study were created by diluting the homogeneous solutions of DOL-Al(OTf)3 with appropriate amounts of DOL-LITFSI to create initially liquid DOL electrolytes containing variable fractions of Al(OTf)3. All of the electrolytes were respectively injected into dry cells to facilitate the polymerization of DOL. The polymerization typically proceeded at 25-75° C. for 1-48 hours.

The inorganic solid electrolyte was LGPS-type obtained in Example 2 and the second liquid solvent was an unsaturated phosphazene (UPA) having the following structure:

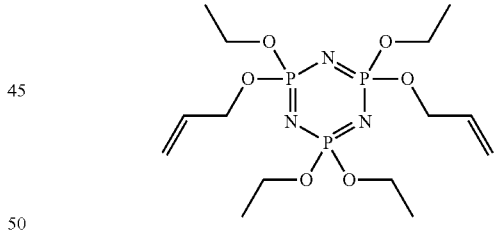

This UPA was synthesized according to a procedure reported by Mason K. Harrup, et al. "Unsaturated phosphazenes as co-solvents for lithium-ion battery electrolytes," Journal of Power Sources 278 (2015) 794-801. The VC/UPA or FEC/UPA ratio was varied as 25/75, 50/50, and 75/25.

Example 7: VC or FEC as the First Liquid Solvent and Trifluoro-Phosphate (TFP) as the Second Liquid Solvent In this study, VC or FEC was used as the first liquid solvent, azodiisobutyronitrile (AIBN) as the initiator, lithium difluoro(oxalate) borate (LiDFOB) as the lithium salt, and TFP as the second flame-retardant liquid solvent. TFP has the following chemical structure:

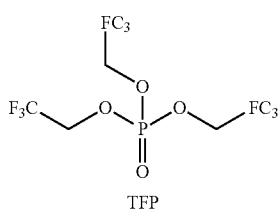

TFP

Solutions containing 1.5 M LiDFOB in VC and FEC, respectively, and 0.2 wt % AIBN (vs VC or FEC) were prepared. Then, TFP (TFPNC or TFP/FEC ratios being from 10/90 to 50/50) was added into the solution to form mixed electrolyte solutions. The electrolyte solutions were separately injected into different dry battery cells, allowing the electrolyte solution to permeate into the anode (wetting out particles of the ISE obtained in Example 3 and the anode active material; e.g., graphite particles), into the cathode (wetting out the ISE and the cathode active material; e.g., NCM-532 particles), and into the porous separator layer (porous PE/PP film or nonwoven of electro-spun PAN nano-fibers). The battery cells were stored at 60° C. for 24 h and then 80° C. for another 2 h to obtain polymerized VC or polymerized FEC that contained TFP in their matrix of polymer chains. The polymerization scheme of VC is shown below (Reaction scheme 1):

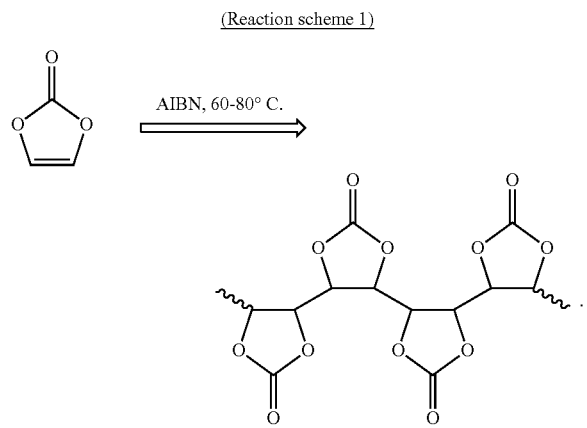

It may be noted that presumably FEC inside the cell may be naturally converted to VC according to the following reaction and the resulting VC can be polymerized according to the following Reaction scheme 2:

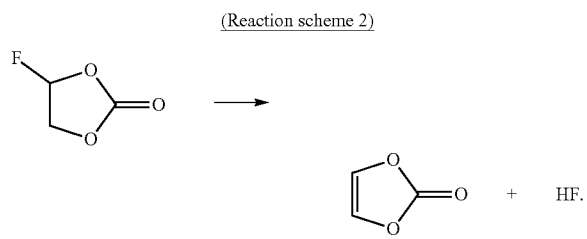

The resultant VC is then polymerized according to Reaction scheme 1 shown above.

Presumably, the HF can help form a LiF-rich solid electrolyte interface layer on Li anode or graphite anode material surface for improved cycling performance.

Example 8: Vinyl Ethylene Sulfite (VES) as the First Solvent and Hydrofluoro Ether (HFE) as the Second Solvent Under the protection of an argon gas atmosphere, vinyl ethylene sulfite (VES), hydrofluoro ether (FIFE), and tetra (ethylene glycol) diacrylates were stirred evenly to form a solution. Bis trifluoromethyl sulfimide lithium was then dissolved in the solution to obtain a solution mixture. In this solution mixture, the weight fractions for the four ingredients were VEC (40%). HFE (20%), tetra(ethylene glycol) diacrylates (20%), and bis trifluoromethyl sulfimide (10%).

The mixed solution was added to a lithium-ion cell having an NCM cathode, graphite anode, particles of ISE prepared in Example 1, and porous PE/PP membrane. After the mixed solution was injected, the mixed solution accounted for 3% of the total cell weight. The cell was exposed to electron beam at 50° C. until a dosage of 20 kGy was reached. VEC was polymerized and crosslinked to become a solid polymer, but HFE remained as a liquid.

Example 9: Lithium-Ion Cell Featuring an In Situ Polymerized Phenyl Vinyl Sulfide (PVS) in the Presence of a Second Solvent TMS (PVS/TMS Ratio=9/1)

TMS has the following chemical formula:

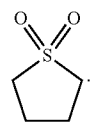

The lithium-ion cells prepared in this example comprise an anode of meso-carbon micro-beads (MCMB, an artificial graphite supplied from China Steel Chemical Co. Taiwan), a cathode of NCM-622 particles, and a porous PE/PP membrane as a separator.

Phenyl vinyl sulfide (first liquid solvent), TMS (second solvent). CTA (chain transfer agent, shown below), AIBN (initiator, 1.0%), and 5% by weight of lithium trifluorometasulfonate (LiCF$_3$SO$_3$), were mixed an injected into the lithium-ion cell, and heated at 60° C. to obtain a battery cell containing an in situ cued polymer electrolyte mixed with particles of an ISE obtained in Example 4.

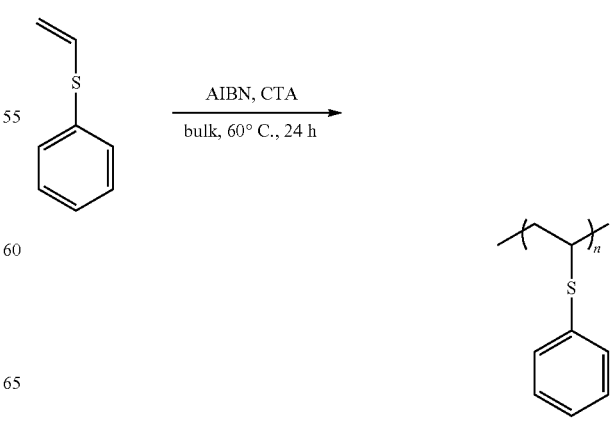

CTA 4

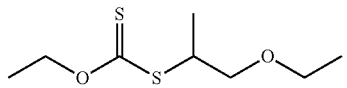

Example 10: Lithium-Ion Cell Featuring an In Situ Polymerized Phenyl Vinyl Sulfone The lithium-ion cells prepared in this example comprise an anode of graphene-protected Si particles, a cathode of NCM-622 particles, particles of an ISE prepared in Example 2, and a porous PE/PP membrane as a separator.

Phenyl vinyl sulfone (PVS) can be polymerized with several anionic-type initiators; e.g., n-BuLi, ZnEt2, LiN$(CH_2)_2$, and $NaNH_2$. The second solvent may be selected from pyridine, sulfolane, Trimethyl phosphate (TMP), Trifluoro-Phosphate (TFP), etc. Trimethyl phosphate has the following chemical structure:

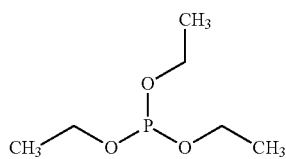

A mixture of PVS, TFP, n-BuLi (1.0% relative to PVS), and $LiBF_4$ (0.5 M) was thoroughly mixed and injected into the battery cell, which was maintained at 30° C. overnight to cure the polymer.

Example 11: Quasi-Solid and Solid-State Electrolytes from Vinylphosphonic Acid (VPA)

The free radical polymerization of vinylphosphonic acid (VPA) can be catalyzed with benzoyl peroxide as the initiator. In a procedure, 150 parts vinylphosphonic acid, 0.75 parts benzoyl peroxide, and 20 parts of lithium bis(oxalato) borate (LiBOB) were dissolved in 150 parts isopropanol. For the preparation of lithium cells, dry cells were injected with the reactive mass, followed by removal of most of the isopropanol and replaced with TFP as a second solvent. The cell was then heated for 5 hours at 90° C. to form polyvinylphosphonic acid, mixed with 5% by weight TFP.

In a separate experiment, vinylphosphonic acid was heated to >45° C. (melting point of VPA=36° C.), which was added with benzoyl peroxide, LiBOB, and 25% by weight of a garnet-type solid electrolyte ($Li_7La_3Zr_2O_{12}$ (LLZO) powder). After rigorous stirring, the resulting paste was cast onto a glass surface and cured at 90° C. for 5 hours to form a solid electrolyte separator to be disposed between an anode and a cathode layer. For a lithium-ion cell, a natural graphite-based anode, a solid electrolyte separator, and a $LiCoO_2$-based cathode were combined. For an anode-less lithium cell, a solid electrolyte separator layer is implemented between a Cu foil and a $LiCoO_2$-based cathode layer.

Electrochemical measurements (CV curves) were carried out in an electrochemical workstation at a scanning rate of 1-100 mV/s. The electrochemical performance of the cells was evaluated by galvanostatic charge/discharge cycling at a current density of 50-500 mA/g using an Arbin electrochemical workstation. Testing results indicate that the cells containing quasi-solid or solid-state electrolytes obtained by in situ curing perform very well. These cells are flame resistant and relatively safe.

Example 12: In Situ Cured Diethyl Vinylphosphonate and Diisopropyl Vinylphosphonate Polymer Electrolytes in a Lithium/NCM-532 Cell (Initially the Cell being Lithium-Free) and Lithium-Ion Cell Containing a Si-Based Anode and an NCM-532 Cathode Both diethyl vinylphosphonate and diisopropyl vinylphosphonate can be polymerized by a peroxide initiator (di-tert-butyl peroxide), along with $LiBF_4$, to clear, light-yellow polymers of low molecular weight. In a typical procedure, either 85% by weight of diethyl vinylphosphonate or diisopropyl vinylphosphonate (being a liquid at room temperature) and 5% of a second liquid solvent (unsaturated phosphazene) were added with di-tert-butyl peroxide (1% by weight) and $LiBF_4$ (9% by weight) to form a reactive solution. The solution was heated to 45° C. and injected into a dry battery cell. Bulk polymerization was allowed to proceed for 2-12 hours inside a battery cell. For the construction of a lithium-ion cell, a graphene-coated Si particle-based anode, a porous separator, and a NCM-532-based cathode were stacked and housed in a plastic/Al laminated envelop to form a cell. For the construction of a lithium metal cell, a Cu foil anode current collector, a porous separator, and a NCM-532-based cathode were stacked and housed in a plastic/Al laminated envelop to form a cell.

Additionally, layers of diethyl vinylphosphonate and diisopropyl vinylphosphonate polymer electrolytes were cast on glass surfaces and polymerized under comparable conditions. The lithium ion conductivity of these solid-state electrolytes was measured. The lithium ion conductivity of diethyl vinylphosphonate derived polymers was found to be in the range of $5.4\times10^{-5}$ S/cm-$7.3\times10^{-4}$ S/cm and that of diisopropyl vinylphosphonate polymer electrolytes in the range of $6.6\times10^{-5}$ S/cm-$8.4\times10^{-4}$ S/cm without a second solvent. Both arm solid state electrolytes that are highly flame resistant. The presence of phosphazene liquid was found to increase the lithium ion conductivity by 3-5 times.

In several samples, a garnet-type solid electrolyte ($Li_7La_3Zr_2O_{12}$ (LLZO) powder) was added into the cathode (NCM-532) in the anode-less lithium battery.

Example 13: Solid State Electrolytes Via In Situ Curing of Cyclic Esters of Phosphoric Acid As selected examples of polymers from phosphates, five-membered cyclic esters of phosphoric acid of the general formula: —$CH_2CH(R)OP(O)$—$(OR')O$— were polymerized to solid, soluble polymers of high molecular weight by using $n-C_4H_9Li$, $(C_5H_5)_2Mg$, or $(i-C_4H_9)_3Al$ as initiators. The resulting polymers have a repeating unit as follows:

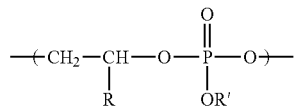

where R is H, with $R'=CH_3$, $C_2H_5$, $n-C_3H_7$, $i-C_3H_7$; $n-C_4H_9$, $CCl_3CH_2$, or $C_6H_5$, or R is $CH_2Cl$ and R' is $C_2H_5$. The polymers typically have $M_n=10^4$-$10^5$.

In a representative procedure, initiators n-C$_4$H$_9$Li (0.5% by weight) and 5% lithium bis(oxalato)borate (LiBOB) as a lithium salt were mixed with 2-alkoxy-2-oxo-1,3,2-dioxaphospholan (R'=H in the following chemical formula):

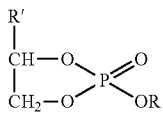

A second solvent, DMMP, having the following structure, was used to adjust the viscosity of the reactant mixture:

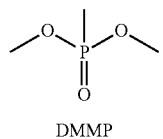

DMMP

The mixture was introduced into a battery cell and the anionic polymerization was allowed to proceed at room temperature (or lower) overnight to produce a solid state electrolyte in situ. The room temperature lithium ion conductivities of this series of solid electrolytes are in the range of 2.5×10$^{-5}$ S/cm-1.6×10$^{-3}$ S/cm.

Both Li metal cells (containing a lithium foil as an anode material) and Li-ion cells (containing artificial graphite particles as an anode active material) were prepared. Both cells comprise NCA particles as the cathode active material.

The invention claimed is:

1. A rechargeable lithium battery cell comprising an anode, a cathode, and a hybrid quasi-solid or solid-state electrolyte in ionic communication with the anode and the cathode, wherein:
    the hybrid electrolyte, having a lithium ion conductivity from 10$^{-5}$ S/cm to 5×10$^{-2}$ S/cm, comprises a mixture of a polymer and an inorganic solid electrolyte;
    the polymer is a polymerization or crosslinking product of a reactive additive, wherein the reactive additive comprises (i) a first liquid solvent that is polymerizable, (ii) an initiator or curing agent, and (iii) a lithium salt; wherein the first liquid solvent occupies from 1% to 99% by weight based on the total weight of the reactive additive;
    the polymer is present in the anode, the cathode, the separator, an interface between the anode and the separator, and/or an interface between the cathode and the separator; and
    the hybrid electrolyte forms a contiguous phase in the cathode or in the anode, and occupies from 3% to 40% by volume of the cathode or from 3% to 40% by volume of the anode.

2. The rechargeable lithium cell of claim 1, wherein the inorganic solid electrolyte material is selected from an oxide type, sulfide type, hydride type, halide type, borate type, phosphate type, lithium phosphorus oxynitride (LiPON), garnet-type, lithium superionic conductor (LISICON) type, sodium superionic conductor (NASICON) type, or a combination thereof.

3. The rechargeable lithium cell of claim 1, wherein the first liquid solvent is selected from the group consisting of vinylene carbonate, ethylene carbonate, fluoroethylene carbonate, ethylene glycol phenyl ether acrylate) (PEGPEA), ethoxylated trimethyl propyl triacrylate (ETPTA), tetrahydrofuran (THF), vinyl sulfite, vinyl ethylene sulfite, vinyl ethylene carbonate, 1,3-propyl sultone, 1,3,5-trioxane (TXE), 1,3-acrylic-sultones, methyl ethylene sulfone, methyl vinyl sulfone, ethyl vinyl sulfone, methyl methacrylate, vinyl acetate, acrylamide, 1,3-dioxolane (DOL), fluorinated ethers, fluorinated esters, sulfones, sulfides, dinitriles, acrylonitrile (AN), sulfates, siloxanes, silanes, N-methylacetamide, acrylates, ethylene glycols, phosphates, phosphonates, phosphinates, phosphines, phosphine oxides, phosphonic acids, phosphorous acid, phosphites, phosphoric acids, phosphazene compounds, derivatives thereof, and combinations thereof.

4. The rechargeable lithium cell of claim 1, wherein the electrolyte further comprises a second liquid solvent occupying from 0.1% to 30% by weight of the total electrolyte weight, wherein the first liquid solvent has a lower flash point, a higher vapor pressure, or a higher solubility of the lithium salt as compared with the second liquid solvent.

5. The rechargeable lithium cell of claim 4, wherein the second liquid solvent comprises an ionic liquid selected from the group consisting of room temperature ionic liquids having a cation selected from tetraalkylammonium, di-, tri-, or tetra-alkylimidazolium, alkylpyridinium, dialkyl-pyrrolidinium, dialkylpiperidinium, tetraalkylphosphonium, hexakis(bromomethyl)benzene, and trialkylsulfonium, 1-vinyl-3-dodecyl imidazolium bis(trifluoromethanesulfonyl)imide (VDIM-TFSI), 1-vinyl-3-methylimidazolium bis[(trifluoromethyl)sulfonyl] imide (VMIMTFSI), 1-ethyl-3-methylimidazolium bis(trifluoromethanesulfonyl)imide (EMITFSI), [(poly(diallyldimethyl ammonium bis(fluorosulfonyl)imide, (C$_{10}$H$_{16}$F$_2$N$_2$O$_4$S$_2$)n, vinylimidazolium monomers with N-alkyl substituents, and combinations thereof.

6. The rechargeable lithium cell of claim 4, wherein the second liquid solvent comprises an ionic liquid comprising an anion selected from BF$_4^-$, B(CN)$_4^-$, CH$_3$BF$_3^-$, CH$_2$CHBF$_3^-$, CF$_3$BF$_3^-$, C$_2$F$_5$BF$_3^-$, n-C$_3$F$_7$BF$_3^-$, n-C$_4$F$_9$BF$_3^-$, PF$_6^-$, CF$_3$CO$_2^-$, CF$_3$SO$_3^-$, N(SO$_2$CF$_3$)$_2^-$, N(COCF$_3$)(SO$_2$CF$_3$)$^-$, N(SO$_2$F)$_2^-$, N(CN)$_2^-$, C(CN)$_3^-$, SCN$^-$, SeCN$^-$, CuCl$_2^-$, AlCl$_4^-$, F(HF)$_{2.3}^-$, or a combination thereof.

7. The rechargeable lithium cell of claim 4, wherein the second liquid solvent, different in chemical composition than the first liquid solvent, comprises a liquid selected from the group consisting of fluorinated ethers, fluorinated esters, sulfones, sulfides, nitriles, sulfates, siloxanes, silanes, phosphates, phosphonates, phosphinates, phosphines, phosphine oxides, phosphonic acids, phosphorous acid, phosphites, phosphoric acids, phosphazene compounds, derivatives thereof, and combinations thereof.

8. The rechargeable lithium cell of claim 1, wherein the electrolyte further comprises a flame retardant selected from an organic phosphorus compound, an inorganic phosphorus compound, a halogenated derivative thereof, or a combination thereof.

9. The rechargeable lithium cell of claim 4, wherein the second liquid solvent further comprises a liquid selected from a phosphate, phosphonate, phosphinate, phosphine, or phosphine oxide having the structure of:

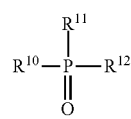

wherein $R^{10}$, $R^{11}$, and $R^{12}$, are independently selected from the group consisting of alkyl, aryl, heteroalkyl, heteroaryl, halogen substituted alkyl, halogen substituted aryl, halogen substituted heteroalkyl, halogen substituted heteroaryl, alkoxy, aryloxy, heteroalkoxy, heteroaryloxy, halogen substituted alkoxy, halogen substituted aryloxy, halogen substituted heteroalkoxy, and halogen substituted heteroaryloxy functional groups, and the second liquid solvent is stable under an applied electrical potential no less than 4 V.

10. The rechargeable lithium cell of claim 4, wherein the first or the second liquid solvent comprises a phosphoranimine having the structure of:

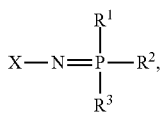

wherein $R^1$, $R^2$, and $R^3$ are independently selected from the group consisting of alkyl, aryl, heteroalkyl, heteroaryl, halogen substituted alkyl, halogen substituted aryl, halogen substituted heteroalkyl, halogen substituted heteroaryl, alkoxy, aryloxy, heteroalkoxy, heteroaryloxy, halogen substituted alkoxy, halogen substituted aryloxy, halogen substituted heteroalkoxy, and halogen substituted heteroaryloxy functional groups, wherein $R^1$, $R^2$, and $R^3$ are represented by at least two different substituents and wherein X is selected from the group consisting of an organosilyl group or a tert-butyl group.

11. The rechargeable lithium cell of claim 10, wherein $R^1$, $R^2$, and $R^3$ are each independently selected from the group consisting of an alkoxy group, and an aryloxy group.

12. The rechargeable lithium cell of claim 1, wherein the lithium salt occupies 0.1%-30% by weight and the cross-linking agent and/or the initiator occupies 0.1-50% by weight of the reactive additive.

13. The rechargeable lithium cell of claim 1, wherein the first liquid solvent comprises a solvent selected from the group consisting of fluorinated vinyl carbonates, fluorinated vinyl monomers, fluorinated esters, fluorinated vinyl esters, and fluorinated vinyl ethers and combinations thereof.

14. The rechargeable lithium cell of claim 1, wherein the first liquid solvent comprises a sulfone or sulfide selected from vinyl sulfone, allyl sulfone, alkyl vinyl sulfone, aryl vinyl sulfone, vinyl sulfide, TrMS, MTrMS, TMS, EMS, MMES, EMES, EMEES, or a combination thereof:

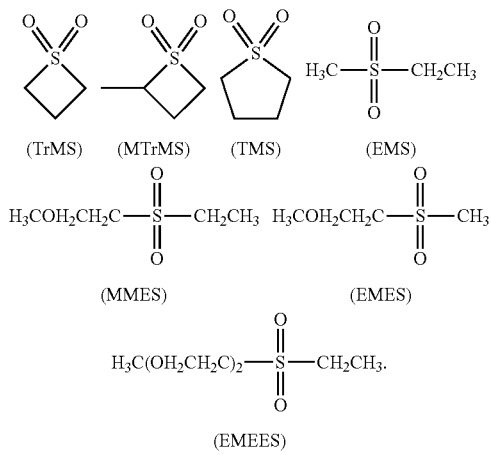

15. The rechargeable lithium cell of claim 14, wherein the vinyl sulfone or sulfide is selected from ethyl vinyl sulfide, allyl methyl sulfide, phenyl vinyl sulfide, phenyl vinyl sulfoxide, allyl phenyl sulfone, allyl methyl sulfone, divinyl sulfone, or a combination thereof, wherein the vinyl sulfone does not include methyl ethylene sulfone and ethyl vinyl sulfone.

16. The rechargeable lithium cell of claim 1, wherein the first liquid solvent comprises a nitrile, a dinitrile selected from ADN, GLN, or SEN, or a combination thereof:

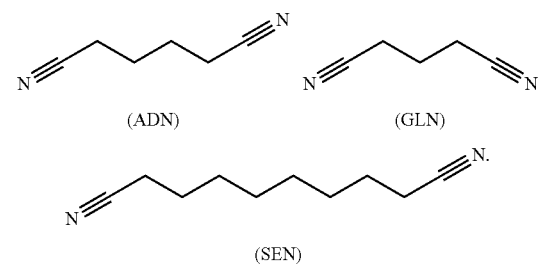

17. The rechargeable lithium cell of claim 1, wherein the first liquid solvent comprises a phosphate selected from allyl-type, vinyl-type, styrenic-type and (meth) acrylic-type monomers bearing a phosphonate moiety.

18. The rechargeable lithium cell of claim 1, wherein the first liquid solvent comprises a phosphate, phosphonate, phosphonic acid, phosphazene, or phosphite selected from TMP, TEP, TFP, TDP, DPOF, DMMP, DMMEMP, tris (trimethylsilyl) phosphite (TTSPi), alkyl phosphate, triallyl phosphate (TAP), or a combination thereof, wherein TMP, TEP, TFP, TDP, DPOF, DMMP, DMMEMP, and phosphazene have the following chemical formulae:

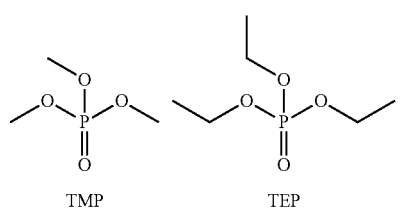

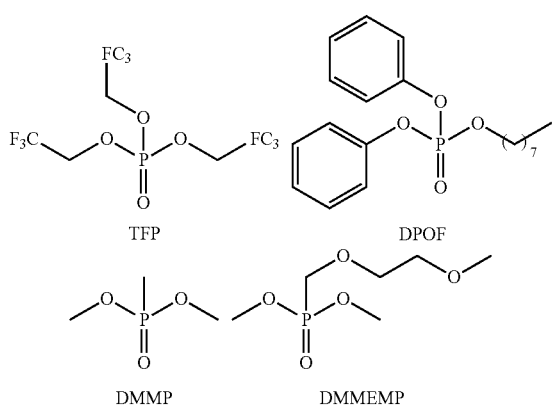

-continued

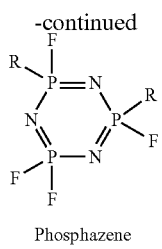

Phosphazene wherein R=H, NH$_2$, or C$_1$-C$_6$ alkyl.

19. The rechargeable lithium cell of claim 1, wherein the first liquid solvent comprises siloxane or silane selected from alkylsiloxane (Si—O), alkylsilane (Si—C), liquid oligomeric silaxane (—Si—O—Si—), or a combination thereof.

20. The rechargeable lithium cell of claim 1, wherein the reactive additive further comprises an amide group selected from N,N-dimethylacetamide, N,N-diethylacetamide, N,N-dimethylformamide, N,N-diethylformamide, or a combination thereof.

21. The rechargeable lithium cell of claim 1, wherein the crosslinking agent comprises a compound having at least one reactive group selected from a hydroxyl group, an amino group, an imino group, an amide group, an acrylic amide group, an amine group, an acrylic group, an acrylic ester group, or a mercapto group in the molecule.

22. The rechargeable lithium cell of claim 1, wherein the crosslinking agent is selected from poly(diethanol)diacrylate, poly(ethyleneglycol)dimethacrylate, poly(diethanol)dimethylacrylate, poly(ethylene glycol)diacrylate, or a combination thereof.

23. The rechargeable lithium cell of claim 1, wherein said initiator is selected from an azo compound, azobisisobutyronitrile, azobisisoheptonitrile, dimethyl azobisisobutyrate, benzoyl peroxide tert-butyl peroxide and methyl ethyl ketone peroxide, benzoyl peroxide (BPO), bis(4-tert-butylcyclohexyl)peroxydicarbonate, t-amyl peroxypivalate, 2,2'-azobis-(2,4-dimethylvaleronitrile), 2,2'-azobis-(2-methylbutyronitrile), 1,1-azobis(cyclohexane-1-carbonitrile, benzoylperoxide (BPO), hydrogen peroxide, dodecamoyl peroxide, isobutyryl peroxide, cumene hydroperoxide, tert-butyl peroxypivalate, diisopropyl peroxydicarbonate, lithium hexafluorophosphate (LiPF$_6$), lithium borofluoride (LiBF$_4$), lithium hexafluoroarsenide (LiAsF$_6$), lithium trifluoro-metasulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium oxalyldifluoroborate (LiBF$_2$C$_2$O$_4$), or a combination thereof.

24. The rechargeable lithium cell of claim 1, wherein said lithium salt is selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-metasulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium oxalyldifluoroborate (LiBF$_2$C$_2$O$_4$), lithium nitrate (LiNO$_3$), Li-Fluoroalkyl-Phosphates (LiPF$_3$(CF$_2$CF$_3$)$_3$), lithium bisperfluoro-ethysulfonylimide (LiBETI), lithium bis(trifluoromethanesulphonyl)imide, lithium bis(fluorosulphonyl)imide, lithium trifluoromethanesulfonimide (LiTFSI), an ionic liquid lithium salt, or a combination thereof.

25. The rechargeable lithium cell of claim 1, wherein the cathode comprises a cathode active material selected from lithium nickel manganese oxide (LiNi$_a$Mn$_{2-a}$O$_4$, 0<a<2), lithium nickel manganese cobalt oxide (LiNi$_n$Mn$_m$Co$_{1-n-m}$O$_2$, 0<n<1, 0<m<1, n+m<1), lithium nickel cobalt aluminum oxide (LiNi$_c$Co$_d$Al$_{1-c-d}$O$_2$, 0<c<1, 0<d<1, c+d<1), lithium manganate (LiMn$_2$O$_4$), lithium iron phosphate (LiFePO$_4$), lithium manganese oxide (LiMnO$_2$), lithium cobalt oxide (LiCoO$_2$), lithium nickel cobalt oxide (LiNi$_p$Co$_{1-p}$O$_2$, 0<p<1), or lithium nickel manganese oxide (LiNi$_q$Mn$_{2-q}$O$_4$, 0<q<2).

26. The rechargeable lithium cell of claim 1, which is a lithium-ion cell wherein the anode comprises an anode active material selected from the group consisting of: (a) silicon (Si), germanium (Ge), tin (Sn), lead (Pb), antimony (Sb), phosphorus (P), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium titanium niobate, lithium-containing titanium oxide, lithium transition metal oxide, ZnCo$_2$O$_4$; (f) carbon or graphite particles (g) prelithiated versions thereof; and (h) combinations thereof.

27. The rechargeable lithium cell of claim 1, which is a lithium metal secondary cell, a lithium-ion cell, a lithium-sulfur cell, a lithium-ion sulfur cell, a lithium-selenium cell, or a lithium-air cell.

28. The rechargeable lithium cell of claim 1, further comprising a separator disposed between the anode and the cathode wherein the separator comprises the hybrid quasi-solid or solid-state electrolyte.

* * * * *